(12) United States Patent
Song et al.

(10) Patent No.: US 12,289,276 B2
(45) Date of Patent: Apr. 29, 2025

(54) MESSAGE ORDER-PRESERVING METHOD, READABLE MEDIUM, AND ELECTRONIC DEVICE

(71) Applicant: Huawei Technologies Co., Ltd., Shenzhen (CN)

(72) Inventors: Yang Song, Shenzhen (CN); Zhiwei Ma, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 22 days.

(21) Appl. No.: 18/549,230

(22) PCT Filed: Mar. 8, 2022

(86) PCT No.: PCT/CN2022/079757
§ 371 (c)(1),
(2) Date: Sep. 6, 2023

(87) PCT Pub. No.: WO2022/188781
PCT Pub. Date: Sep. 15, 2022

(65) Prior Publication Data
US 2024/0154922 A1 May 9, 2024

(30) Foreign Application Priority Data
Mar. 8, 2021 (CN) .......................... 202110251061.5

(51) Int. Cl.
*H04L 12/823* (2013.01)
*H04L 12/58* (2006.01)
*H04L 12/861* (2013.01)
*H04L 51/043* (2022.01)
*H04L 51/234* (2022.01)
*H04L 51/42* (2022.01)
*H04M 1/7243* (2021.01)

(52) U.S. Cl.
CPC .......... *H04L 51/043* (2013.01); *H04L 51/234* (2022.05); *H04L 51/42* (2022.05); *H04M 1/7243* (2021.01)

(58) Field of Classification Search
CPC ..... H04L 51/043; H04L 51/42; H04L 51/234; H04L 12/823; H04L 12/861; H04L 12/58; H04L 29/08; H04M 1/7243; G06F 17/27
USPC .......................................................... 709/206
See application file for complete search history.

(56) References Cited

U.S. PATENT DOCUMENTS

2016/0227019 A1* 8/2016 Seol .................. H04M 1/72436
2017/0366481 A1* 12/2017 Sagar ..................... H04L 51/04

FOREIGN PATENT DOCUMENTS

CN 111405043 A 7/2020

* cited by examiner

*Primary Examiner* — Jude Jean Gilles
(74) *Attorney, Agent, or Firm* — Conley Rose, P.C.

(57) ABSTRACT

A message order-preserving method includes that a first electronic device generates a first message to be sent to a second electronic device, and starts to send the first message to the second electronic device. The first electronic device generates a second message to be sent to the second electronic device, and before sending the second message to the second electronic device, determines that sending of the first message is not completed. The first electronic device sends an integration message including the second message to the second electronic device. After receiving the integration message, the second electronic device displays the first message and the second message based on the integration message.

20 Claims, 20 Drawing Sheets

MESSAGE ORDER-PRESERVING METHOD, READABLE MEDIUM, AND ELECTRONIC DEVICE

CROSS-REFERENCE TO RELATED APPLICATIONS

This application is a U.S. National Stage of International Patent Application No. PCT/CN2022/079757 filed on Mar. 8, 2022, which claims priority to Chinese Patent Application No. 202110251061.5 filed on Mar. 8, 2021, both of which are hereby incorporated by reference in their entireties.

TECHNICAL FIELD

This application relates to the communication field, and in particular, to a message order-preserving method, a readable medium, and an electronic device.

BACKGROUND

With the continuous development of Internet technology, an instant messaging (Instant Messaging. IM) application has become an important way of communication between people. Instant messaging is a real-time communication service that allows a user to establish a private session on a network. As IM applications such as WeChat, QQ, and DingTalk are widely used, the user may install an IM application on a terminal device such as a mobile phone or a tablet computer, and use the installed IM application to perform a session.

When the user performs the session by using the IM application, sent message content may be a plurality of types of rich media messages such as a text, an image, a video, and a file. To save network traffic and ensure security of data transmission, before sending a message, the terminal device generally performs processing such as compression and encryption on message content with a large data volume, such as a file, a video, and an audio, and then transmits processed message content through a network. As a result, time for transmitting message content of different types and different sizes is different, and when a plurality of messages are sent, a message sent first is received later, and a message sent later is received first. Consequently, a sending sequence of a message is inconsistent with a receiving sequence of the message, and this affects user experience.

SUMMARY

Embodiments of this application provide a message order-preserving method, a readable medium, and an electronic device. In the technical solutions of this application, before a current message is sent, it is determined whether there is a message that is sent completely. When it is determined that there is a message that is not sent completely, reference information of the message that is not sent completely and this message are integrated and then sent. After receiving an integration message, a receiving end parses the integration message. When it is parsed that the integration message carries information indicating that the previous message is not received, a sequence of displaying the received message to a user is that the previous message is before the current message. In this way, in a message session, a receiving sequence of a message displayed to the user is consistent with a sending sequence of the message, and this improves user experience.

According to a first aspect, an embodiment of this application provides a message order-preserving method, including: A first application of a first electronic device generates a first message to be sent to a second electronic device, and starts to send the first message to the second electronic device; the first application of the first electronic device generates a second message to be sent to the second electronic device, and before sending the second message to the second electronic device, determines that sending of the first message is not completed; the first electronic device sends an integration message including the second message to the second electronic device, where the integration message includes the second message and a first identifier indicating that sending of the first message is not completed; and after receiving the integration message, the second electronic device displays the first message and the second message based on the integration message.

The first application may be an instant messaging application, or may be various applications that can implement an instant messaging function, such as live broadcast, video conference, or online education. This is not limited in this application.

In some embodiments, after receiving the integration message including the second message, the second electronic device displays prompt information of the first message on a display interface of the first application, and simultaneously displays the second message. A location of the prompt information of the first message on the display interface of the first application is above the second message.

In some embodiments, after determining that the first message is received, the second electronic device stops displaying the prompt information of the first message on the display interface of the first application of the second electronic device, and replaces the prompt information of the first message with the first message. A location of the first message on the display interface of the first application is above the second message.

In some embodiments, the second electronic device determines that the integration message is received before the first message is received; and the second electronic device simultaneously displays by the first message and the second message on the display interface of the first application. A location of the first message on the display interface of the first application is above the second message.

In a possible implementation of the first aspect, the method further includes: The first identifier includes at least one of an ID or type information of the first message.

The ID of the first message may be, for example, a 32-bit unique character string obtained through hashing by using an SHA256 hash algorithm. A type of the first message may be an image, a text, a file, a video, an audio, or the like.

In a possible implementation of the first aspect, after receiving the integration message, that the second electronic device displays the first message and the second message based on the integration message includes:

after receiving the integration message, the second electronic device displays prompt information of the first message on a display interface of the first application, and displays the second message at the same time. A location of the prompt information of the first message on the display interface of the first application is above the second message.

In some embodiments, the prompt information of the first message may also be referred to as pre-placeholder information of the first message. The prompt information of the first message may be a first frame picture of a video, a thumbnail of an image, an animation indicating that the message is being downloaded, or the like.

In a possible implementation of the first aspect, the method further includes:

After determining that the first message is received, the second electronic device stops displaying the prompt information of the first message on the display interface of the first application of the second electronic device, and replaces the prompt information of the first message with the first message. A location of the first message on the display interface of the first application is above the second message.

In a possible implementation of the first aspect, the method further includes: The prompt information of the first message includes at least one of an image, a text, and an animation.

In a possible implementation of the first aspect, that the second electronic device displays the first message and the second message based on the integration message after receiving the integration message includes: The second electronic device determines that the integration message is received before the first message is received, and the second electronic device simultaneously displays the first message and the second message on a display interface of the first application. A location of the first message on the display interface of the first application is above the second message.

In a possible implementation of the first aspect, the method further includes: The first application includes at least one of an instant messaging application, a live broadcast application, a video conference application, or an online education application.

In a possible implementation of the first aspect, the method further includes: The first electronic device sends, to the second electronic device by using a server, the message generated by the first application.

According to a second aspect, an embodiment of this application provides a message order-preserving method, including: A first application of a first electronic device generates a first message to be sent to a second electronic device, and starts to send the first message to the second electronic device.

The first application of the first electronic device generates a second message to be sent to the second electronic device, and before sending the second message to the second electronic device, determines that sending of the first message is not completed.

The first electronic device sends an integration message including the second message to the second electronic device, where the integration message includes the second message and a first identifier indicating that sending of the first message is not completed.

In some embodiments, the integration message may be obtained after the second message and the first identifier indicating that sending of the first message is not completed are encapsulated by using a MeeTime protocol format. For a specific format of the MeeTime protocol, reference may be made to the specific implementation.

In a possible implementation of the second aspect, the method further includes: The first identifier includes at least one of ID information or type information of the first message.

In some embodiments, the first identifier may further include a sending time and the like.

In a possible implementation of the second aspect, the method further includes: The first application includes at least one of an instant messaging application, a live broadcast application, a video conference application, or an online education application.

In a possible implementation of the second aspect, the method further includes: The first electronic device sends, to the second electronic device by using a server, the message generated by the first application.

According to a third aspect, an embodiment of this application provides a message order-preserving method, including:

A second electronic device receives an integration message including a second message from a first electronic device, where the integration message includes the second message and a first identifier indicating that sending of a first message is not completed, and the first message and the second message are generated by a first application of the first electronic device.

After receiving the integration message, the second electronic device displays the first message and the second message based on the integration message.

In a possible implementation of the third aspect, the method further includes: The first identifier includes at least one of ID information or type information of the first message.

In a possible implementation of the third aspect, after receiving the integration message, that the second electronic device displays the first message and the second message based on the integration message includes:

after receiving the integration message, the second electronic device displays prompt information of the first message on a display interface of the first application, and simultaneously displays the second message. A location of the prompt information of the first message on the display interface of the first application is above the second message.

In a possible implementation of the third aspect, the method further includes: After the second electronic device determines that the first message is received, stopping displaying the prompt information of the first message on the display interface of the first application of the second electronic device, and replacing the prompt information of the first message with the first message. A location of the first message on the display interface of the first application is above the second message.

In a possible implementation of the third aspect, the method further includes: The prompt information of the first message includes at least one of an image, a text, or an animation.

In a possible implementation of the third aspect, after receiving the integration message, that the second electronic device displays the first message and the second message based on the integration message includes:

The second electronic device determines that the integration message is received before the first message is received; and the second electronic device simultaneously displays the first message and the second message on a display interface of the first application. A location of the first message on the display interface of the first application is above the second message.

In a possible implementation of the third aspect, the method further includes: The first application includes at least one of an instant messaging application, a live broadcast application, a video conference application, or an online education application.

In a possible implementation of the third aspect, the method further includes: The second electronic device receives, from the first electronic device by using the server, the message generated by the first application of the first electronic device.

According to a fourth aspect, an embodiment of this application provides a readable medium. The readable medium stores instructions, and when the instructions are executed on an electronic device, the electronic device performs the message order-preserving method according to any one of the first aspect and the possible implementations of the first aspect.

According to a fifth aspect, an embodiment of this application provides an electronic device, including:

a memory, configured to store instructions executed by one or more processors on the electronic device; and a processor, and when the instructions are executed by the one or more processors, the processor is configured to perform the message order-preserving method according to any one of the first aspect and the possible implementations of the first aspect.

DESCRIPTION OF EMBODIMENTS

The illustrative embodiments of this application include but are not limited to a message order-preserving method, a readable medium, and an electronic device.

To resolve a problem that a sending sequence of a message is inconsistent with a receiving sequence of the message in a message session, embodiments of this application provide a message order-preserving method. Specifically, it is assumed that a user sends a message B to a second electronic device by using a first electronic device. If the first electronic device determines, before sending the message B, that sending of a previous message A (that is, a previous message of a currently sent message B) is not completed, the first electronic device encapsulates information such as a type (such as a text, an image, a video, or a file) of the uncompleted message A and an ID of the message together with the to-be-sent message B according to a specified protocol format, and then sends the encapsulated information to the second electronic device. After receiving the message A, the second electronic device parses the message A. If it is determined that based on a sending sequence of the first electronic device, there is still a message A that is not received before the message B, the second electronic device displays the message A and the message B in the message session after the message A is received. Alternatively, the second electronic device first displays, in the message session, a piece of content indicating that the message A is being downloaded, for example, first displays an animation of "the message A is being downloaded", and after the message A is downloaded, displays content of the message A, and then displays the message B. In this way, in the message session, the receiving sequence of a message displayed to a user is consistent with the sending sequence of the message, and this improves user experience.

The following further describes embodiments of this application in detail with reference to the accompanying drawings.

Figure 1:
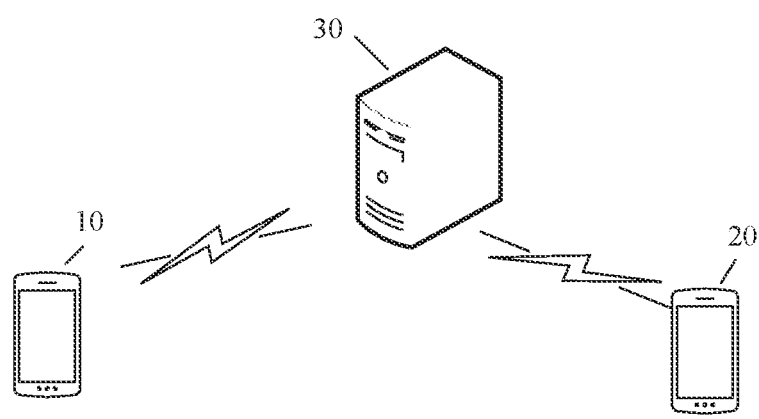
FIG. 1 is a diagram of a scenario in which a user performs a message session by using an electronic device according to some embodiments of this application.

FIG. 1 shows a scenario in which an electronic device 10 and an electronic device 20 perform a message session according to some embodiments of this application. The embodiment shown in FIG. 1 includes the electronic device 10, the electronic device 20, and a server 30.

IM applications (Applications, APPs) are installed on the electronic device 10 and the electronic device 20. If a first user and a second user need to perform the message session by using an IM app of the electronic device 10 and an IM app of the electronic device 20 separately, the first user and the second user may perform the session by using the IM app after successfully logging in to the IM app of the electronic device 10 and the IM app of the electronic device 20. For example, the electronic device 10 sends, by using a radio frequency circuit and an antenna of the electronic device 10, a message that is entered by the first user by using the IM app of the electronic device to the server 30 through a wireless communication link, and the server 30 stores a received message, and then sends the received message to the electronic device 20 through the wireless communication link. The electronic device 20 may perform the message order-preserving method provided in this embodiment of this application, so that a sequence of a message received by the second user by using the IM app of the electronic device 20 is consistent with a sequence of a message sent by the first user to the second user by using the IM app of the electronic device 10. Similarly, a sequence of a message received by the first user by using the IM app of the electronic device 10 is consistent with a sequence of a message sent by the second user to the first user by using the IM app of the electronic device 20.

Figure 2A:
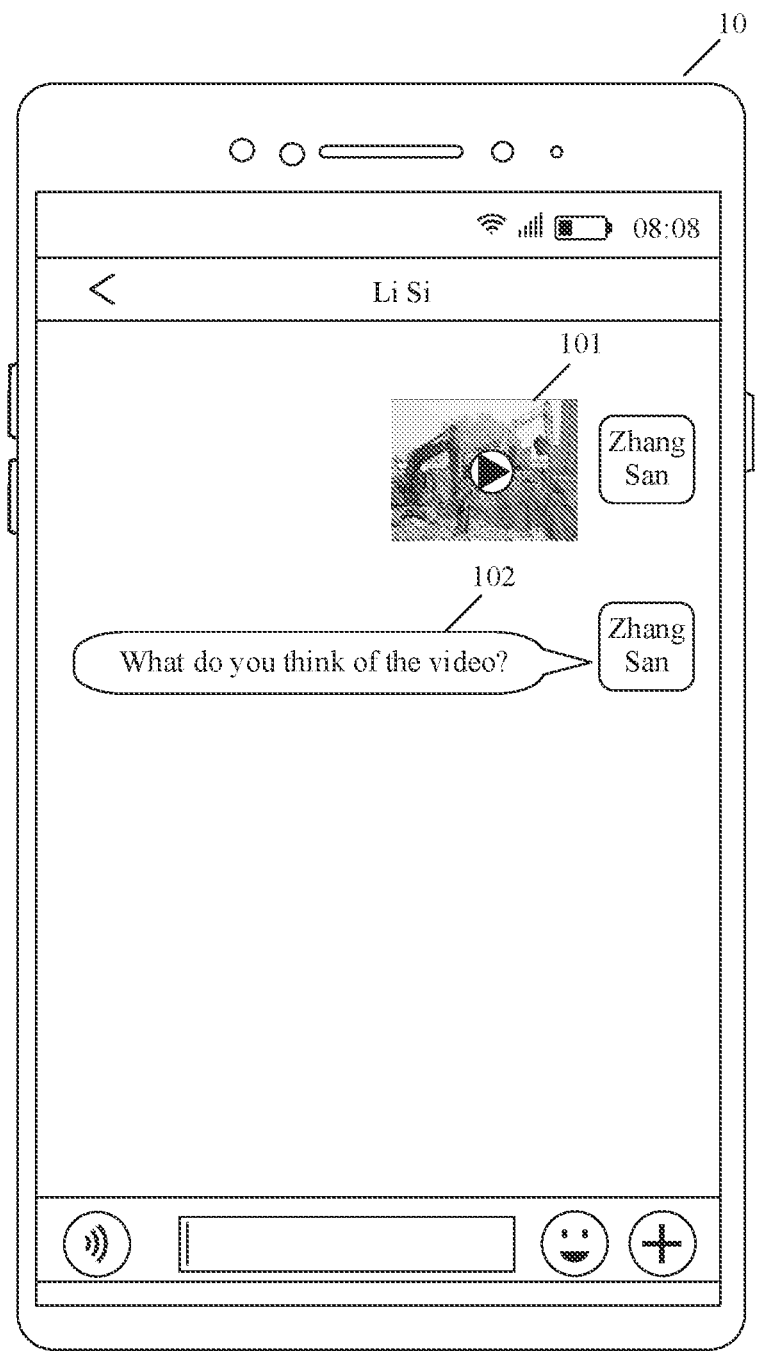
FIG. 2(a) is an interface diagram of sending a message to a user Li Si by using an IM app of a mobile phone by a user Zhang San according to some embodiments of this application.
Figure 2B:
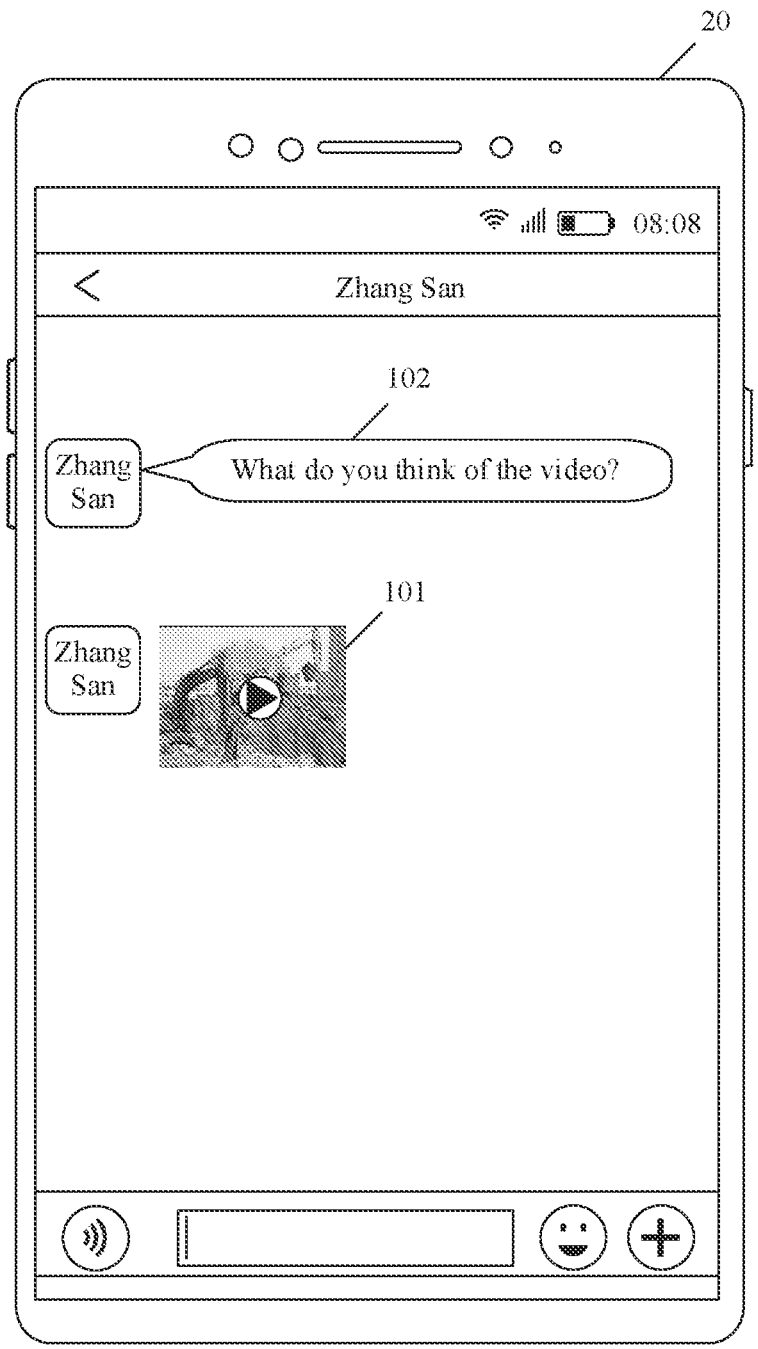
FIG. 2(b) is an interface diagram of receiving, by a user Li Si by using an IM app of a mobile phone, a message sent by a user Zhang San in a related technology.
Figure 2C:
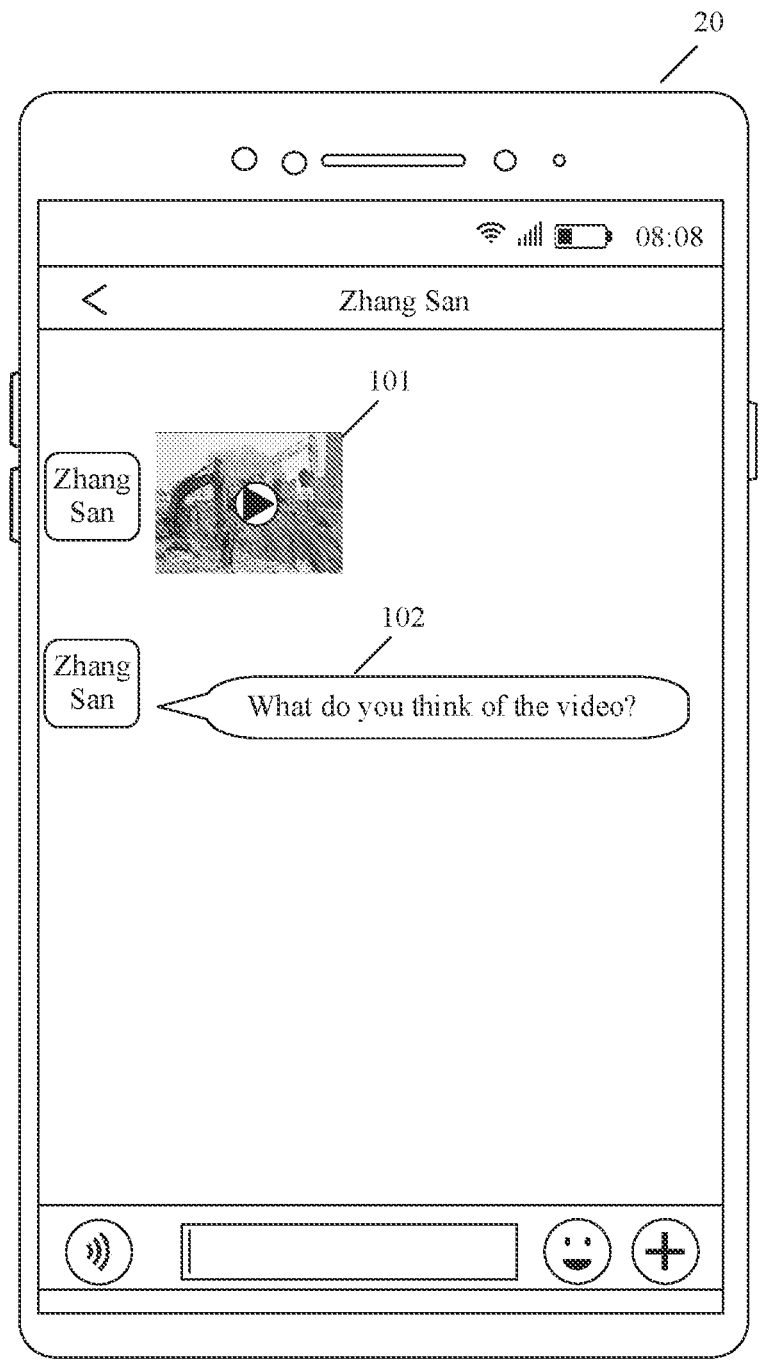
FIG. 2(c) is an interface diagram of receiving, by a user Li Si by using an IM app of a mobile phone, a message sent by a user Zhang San according to some embodiments of this application.

For example, on an interface of a message session shown in FIG. 2(*a*), Zhang San performs a session with Li Si by using the IM app of the electronic device 10. On the session interface of the IM app of the electronic device 10, Zhang San first sends a video message 201 to Li Si, and then sends a text message 202, where content of the text message 202 is "What do you think of the video?" Because a data volume of a video is large, the electronic device 10 usually compresses the video before sending the video. In addition, to ensure security of video transmission, the video needs to be encrypted. Consequently, time consumed for sending a video message is longer than time consumed for sending a text message. Therefore, the text message is first displayed on the IM app of the electronic device 20 held by Li Si, and then the video message is displayed. For example, in the embodiment shown in FIG. 2(*b*), the IM app of the electronic device 20 held by Li Si first displays the received text message 202, that is, "What do you think of the video?", and after three seconds, the received video message 201 is displayed. To be specific, a sequence of the video message 201 and the text message 202 that are sent by Zhang San to Li Si by using the IM app is inconsistent with a sequence of the video message 201 and the text message 202 that are received by Li Si by using the IM app, and this affects user experience.

After the technical solutions of this application are used, for example, on an interface of a message session shown in FIG. 2(*c*), Li Si performs a session with Zhang San by using the IM app of the electronic device 20. On the session interface of the IM app of the electronic device 20, Li Si first receives the video message 201 sent by Zhang San, and then receives the text message 202 "What do you think of the video?" sent by Zhang San. That is, a sequence of the messages that are sent by Zhang San and that are displayed by the IM app of the electronic device 20 held by Li Si is completely consistent with a sequence of the messages that are sent by Zhang San to Li Si by using the IM app of the electronic device 10. In this way, a requirement for maintaining logic of a previous message and a next message when a user reads the messages can be met, thereby improving user experience.

It may be understood that, in embodiments of this application, the electronic device 10 and the electronic device 20 may be various electronic devices having displays, for example, includes but are not limited to a laptop computer, a desktop computer, a tablet computer, a mobile phone, a server, a wearable device, a head-mounted display, a mobile email device, a portable game console, a portable music player, a reader device, a television that is embedded in or coupled to one or more processors, or another electronic device that can access a network.

In addition, it may be understood that the IM app is merely an example application of the solutions of this application, and any application related to a message session may be applied to the technical solutions of this application. For example, the technical solutions of this application may be further applied to a video conference, live broadcast, online education, and the like. This is not limited herein.

In the following description, for brevity of description, the technical solutions of this application are described by using an example in which both the electronic device 10 and the electronic device 20 are mobile phones.

Figure 3:
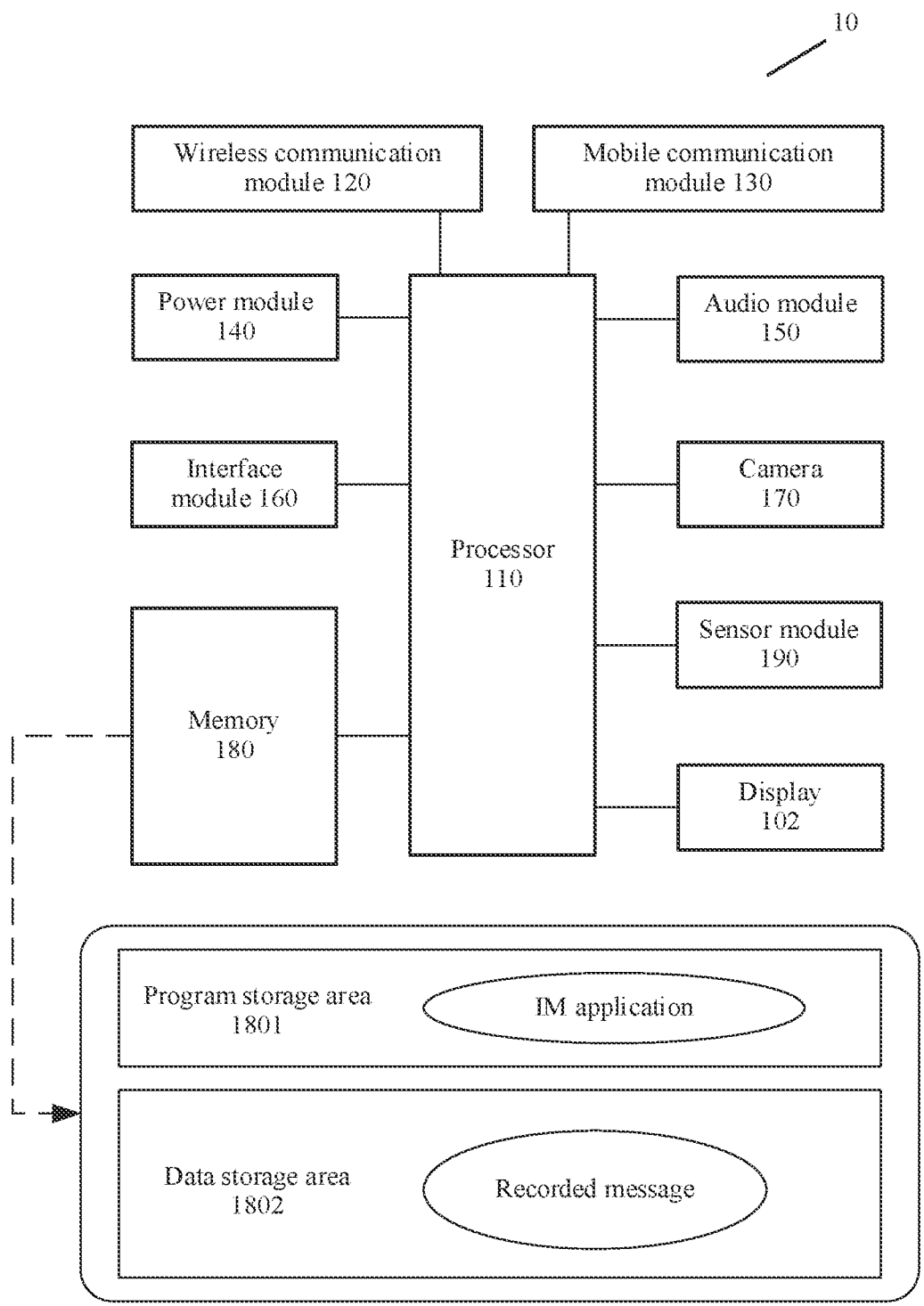
FIG. 3 is a block diagram of a hardware structure of a mobile phone according to some embodiments of this application.

FIG. 3 is a schematic diagram of a hardware structure of a mobile phone 10 according to an embodiment of this application.

The mobile phone 10 can perform the message order-preserving method provided in this embodiment of this application. In FIG. 3, similar components have a same reference numeral. As shown in FIG. 3, the mobile phone 10 may include a processor 110, a power module 140, a memory 180, a camera 170, a mobile communication module 130, a wireless communication module 120, a sensor module IX), an audio module 150, an interface module 160, a display 102, and the like.

It may be understood that a structure illustrated in the embodiments of the present invention does not constitute a specific limitation on the mobile phone 10. In some other embodiments of this application, the mobile phone 10 may include components more or fewer than those shown in the figure, or some components are combined, or some components are split, or the components are disposed differently. The illustrated components may be implemented in hardware, software, or a combination of software and hardware.

The processor 110 may include one or more processing units, for example, may include a processing module or a processing circuit of a central processing unit (Central Processing Unit, CPU), a graphics processing unit (Graphics Processing Unit, GPU), a digital signal processor (Digital Signal Processor, DSP), a micro-programmed control unit (Micro-programmed Control Unit, MCU), an artificial intelligence (Artificial Intelligence, AI) processor, a field programmable gate array (Field Programmable Gate Array. FPGA), or the like. Different processing units may be independent components, or may be integrated into one or more processors. For example, in some embodiments of this application, the processor 110 may be configured to determine whether sending of a message is not completed before an IM app of the mobile phone 10 sends a current message, to determine, based on a determining result, whether to add information such as an ID and a type of a previous message to the to-be-sent current message, to encapsulate the message according to a specified protocol format. For another example, in some embodiments of this application, the processor 110 may be configured to parse whether a received message body carries content representing that the previous message is not received, to determine whether there is a message that is not received completely before the received current message. Further, it is determined, based on the determining result, whether the received current message is directly displayed in the IM app of the mobile phone 10, or pre-placeholder information of the previous message is first displayed before the received current message, or after receiving of the previous message is completed, the previous message and the received current message are displayed in sequence.

The memory 180 may be configured to store data, a software program, and a module; and may be a volatile memory (Volatile Memory) such as a random access memory (Random Access Memory, RAM), may be a non-volatile memory (Nonvolatile Memory), such as a read-only memory (Read-Only Memory, ROM), a flash memory (Flash Memory), a hard disk drive (Hard Disk Drive, HDD), or a solid-state drive (Solid-State Drive, SSD), may be a combination of the foregoing types of memories, or may be a removable storage medium such as a secure digital (Secure Digital, SD) storage card. Specifically, the memory 180 may include a program storage area 1801 and a data storage area 1802. The program storage area 1801 may store program code, and the program code is used to enable the processor 110 to execute the program code to perform the message order-preserving method provided in embodiments of this application. In this embodiment of this application, the data storage area 1802 may be configured to store a recorded message. The recorded message may include ID information of a message, a type of the message, content of the message, and the like.

The power module 140 may include a power supply, a power management component, and the like. The power supply may be a battery. The power management component is configured to manage charging of the power supply and power supplying to another module performed by the power supply. The charging management module is configured to receive charging input from a charger. The power management module is configured to connect to the power supply, the charging management module and the processor 110.

The mobile communication module 130 may include but is not limited to an antenna, a power amplifier, a filter, a low noise amplifier (Low Noise Amplifier, LNA), and the like. The mobile communication module 130 may provide a wireless communication solution that is applied to the mobile phone 10 and that includes 2G, 3G, 4G, 5G, and the like. The mobile communication module 130 may receive an electromagnetic wave through the antenna, perform processing such as filtering or amplification on the received electromagnetic wave, and transmit the electromagnetic wave to a modem processor for demodulation. The mobile communication module 130 may further amplify a signal modulated by the modem processor, and convert the signal into an electromagnetic wave for radiation through the antenna. In some embodiments, at least some functional modules of the mobile communication module 130 may be disposed in the processor 110. In some embodiments, at least some functional modules of the mobile communication module 130 and at least some modules of the processor 110 may be disposed in a same component.

The wireless communication module 120 may include an antenna, and receive and send an electromagnetic wave through the antenna. The wireless communication module 120 may provide a wireless communication solution that is applied to the mobile phone 10 and that includes a wireless local area network (Wireless Local Area Network, WLAN) (for example, a wireless fidelity (Wireless Fidelity. Wi-Fi) network), Bluetooth (Bluetooth. BT), a global navigation satellite system (Global Navigation Satellite System, GNSS), frequency modulation (Frequency Modulation, FM), near field communication (Near Field Communication, NFC), an infrared (Infrared, IR) technology, and the like.

The mobile phone 10 may communicate with a network and another device by using the wireless communication technology.

In some embodiments, the mobile communication module 130 and the wireless communication module 120 that are of the mobile phone 10 may be alternatively located in a same module.

The camera 170 is configured to capture a static image or a video. An object is projected to a photosensitive element by generating an optical image through a lens. The photosensitive element converts an optical signal into an electrical signal, and then transmits the electrical signal to the ISP (Image Signal Processor, image signal processor) to convert it into a digital image signal. The mobile phone 10 may implement an image shooting function by using the ISP, the camera 170, a video codec, the GPU (Graphics Processing Unit, graphics processing unit), the display 102, an application processor, and the like. For example, in some embodiments of this application, when performing a session by using the IM app of the mobile phone 10, the user may choose to send a photo or a video shot by using the camera 170 to a friend in contacts of the IM app of the user.

The display 102 includes a display panel. The display panel may be a liquid crystal display (Liquid Crystal Display, LCD), an organic light-emitting diode (Organic Light-emitting Diode, OLED), an active-matrix organic light-emitting diode (Active-matrix Organic Light-emitting Diode, AMOLED), a flexible light-emitting diode (Flexible Light-emitting Diode, FLED), a mini-LED, a micro-LED, a micro-OLED, a quantum dot light-emitting diode (Quantum Dot Light-emitting Diode, QLED), or the like. For example, the display 102 is configured to display an interface of a message session of the mobile phone 10, and the like.

The sensor module 190 may include an optical proximity sensor, a pressure sensor, a gyroscope sensor, a barometric pressure sensor, a magnetic sensor, an acceleration sensor, a range sensor, a fingerprint sensor, a temperature sensor, a touch sensor, an ambient light sensor, a bone conduction sensor, and the like.

The audio module 150 may convert digital audio information into an analog audio signal for output, or convert an analog audio input into a digital audio signal. The audio module 150 may be further configured to encode and decode an audio signal. In some embodiments, the audio module 150 may be disposed in the processor 110, or some function modules of the audio module 150 are disposed in the processor 110. In some embodiments, the audio module 150 may include a speaker, an earpiece, a microphone, and a headset interface. For example, in some embodiments of this application, when performing a session by using the IM app of the mobile phone 10, the user receives a voice message sent by a member in the contact list of the IM app. The user taps the voice message, and may hear specific content of the voice message through the speaker.

The interface module 160 includes an external memory interface, a universal serial bus (Universal Serial Bus, USB) interface, a subscriber identity module (Subscriber Identity Module, SIM) card interface, and the like. The external memory interface may be configured to connect to an external memory card, for example, a micro SD card, to expand a storage capability of the mobile phone 10. The external memory card communicates with the processor 110 through the external memory interface, to implement a data storage function. The universal serial bus interface is used for communication between the mobile phone 10 and another mobile phone. The subscriber identity module card interface is configured to communicate with the SIM card installed in the mobile phone 10, for example, read a phone number stored in the SIM card, or write the phone number into the SIM card.

In some embodiments, the mobile phone 10 further includes a button, a motor, an indicator, and the like. The buttons may include a volume button, a power-on/power-off button, and the like. The motor is configured to enable the mobile phone 10 to generate a vibration effect. For example, the mobile phone 10 of the user vibrates when receiving a new IM app message, to prompt the user to view the message. The indicator may include a laser indicator, a radio frequency indicator, an LED indicator, and the like.

Figure 4:
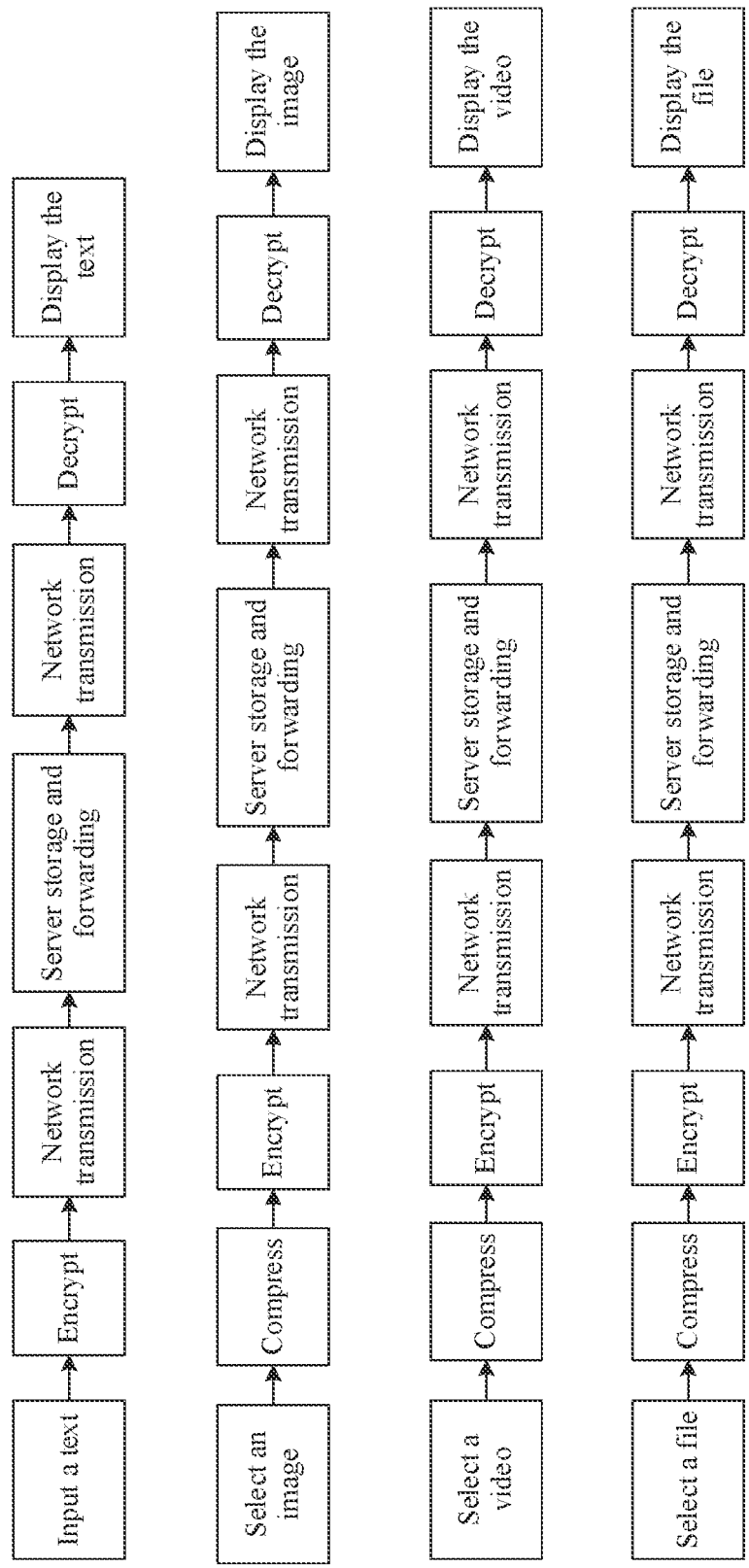
FIG. 4 is a flowchart of message handling when a user uses an IM app of a mobile phone to perform a session in a related technical solution according to some embodiments of this application.
Figure 5A:
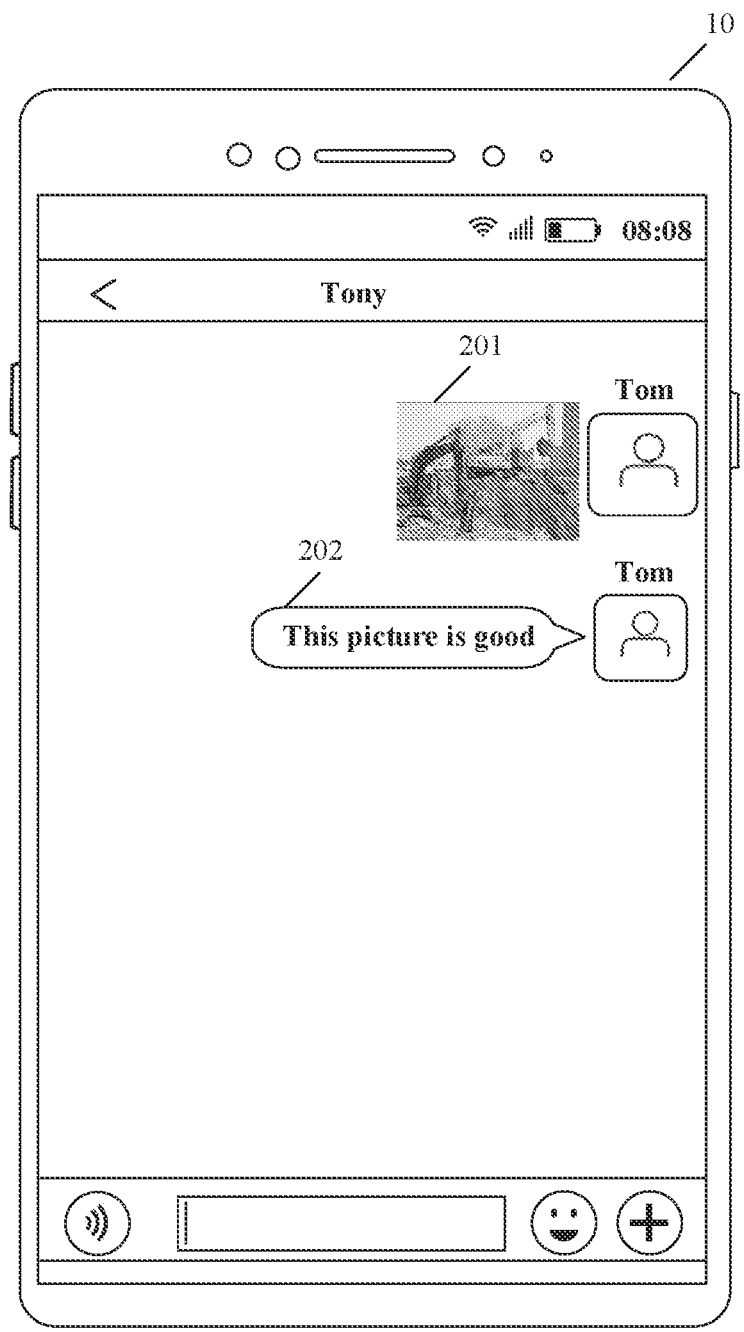
FIG. 5(a) shows an interface of a WeChat session between a user Tom and a user Tony according to some embodiments of this application.
Figure 5B:
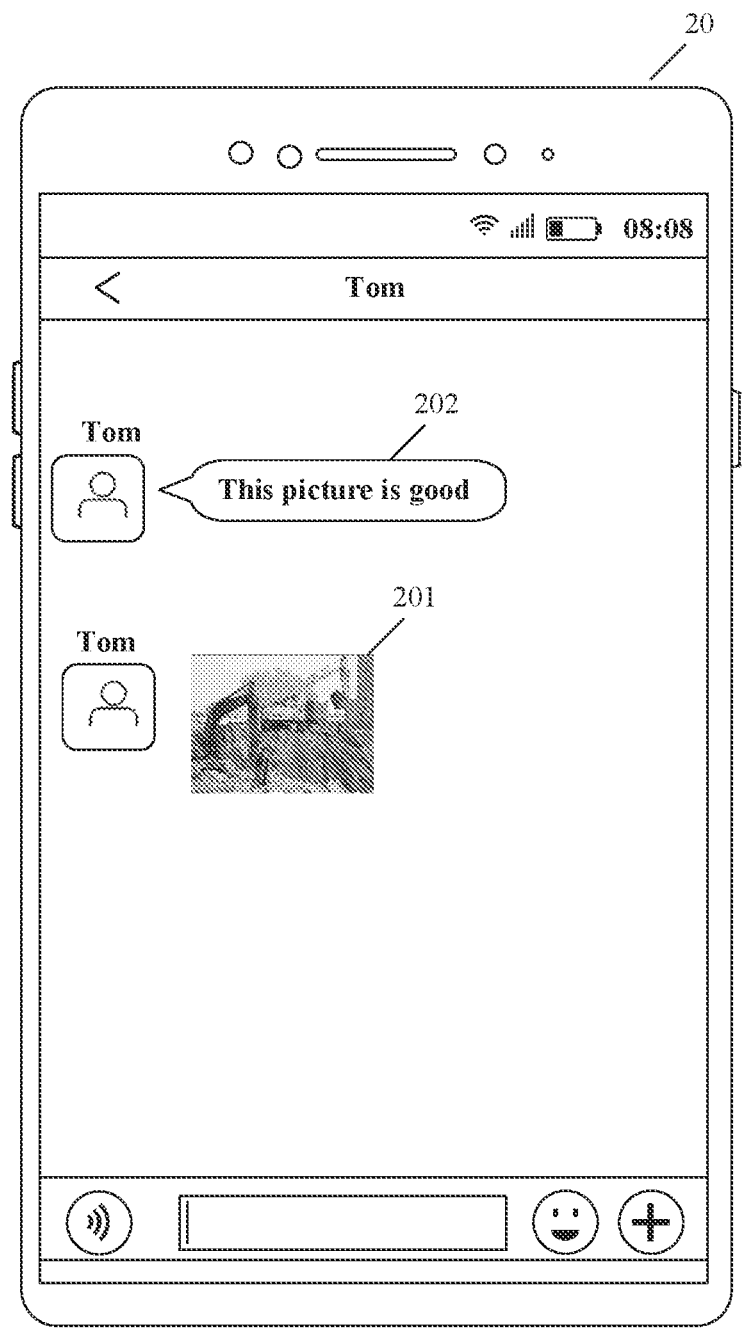
FIG. 5(b) shows an interface of a WeChat session between a user Tony and a user Tom according to some embodiments of this application.

Refer to FIG. 1, FIG. 4, and FIG. 5(*a*) and FIG. 5(*b*). The following describes a message handling method of an IM app in a related technical solution.

As described above, an existing IM app has a problem that a sending sequence of a message is inconsistent with a receiving sequence of the message. FIG. 4 is a flowchart of message handling when a user sends a message by using an IM app of a mobile phone 10 in a related technical solution. It may be understood that the IM app is instant messaging software installed on an electronic device such as the mobile phone 10 for the user to use. In an existing IM app, messages of a same type are generally sent in sequence by using a same thread, and messages of different types are concurrently processed by using a plurality of threads. For example, in the embodiment shown in FIG. 4, when the user inputs a plurality of types of rich media messages such as a text, an image, a video, and a file in the IM app of the mobile phone 10, for a message (for example, an image, a video, and a file) with a large data amount of message content, time consumption in a compression, encryption, and network transmission process is long, and for a message (for example, a text message) with a small data amount of message content, correspondingly, time consumption in a compression, encryption, and network transmission process is short. Therefore, a problem that a sending sequence of a message is inconsistent with a receiving sequence of the message occurs. For example, the text message is received first and then displayed first. However, even if the video message is sent earlier than the text message, the video message may be received and displayed later than the text message. Especially when content of a previous message and a next message is logically related, a sequence of the messages viewed by a message receiver is inconsistent with a sequence of the messages sent by a message sender, and this affects user experience.

For example, on an interface of a WeChat session shown in FIG. 5(*a*), a user Tom performs a session with a user Tony by using a WeChat app of a mobile phone 10. On the session interface of the WeChat app of the user Tom, the user Tom first sends a picture message 201 to the user Tony, and then sends a text message 202. Content of the text message 202 is: "This picture is good". On an interface of a WeChat session shown in FIG. 5(*b*), the user Tony performs a session with the user Tom by using a WeChat app of a mobile phone 20. On the session interface of the WeChat app of the user Tony, the user Tony first receives the text message 202 sent by the user Tom, and then receives the picture message 201 sent by the user Tom. To be specific, a sequence of the messages that are sent by the user Tom and that are displayed by the WeChat app of the mobile phone 20 held by the user Tony is inconsistent with a sequence of the messages that are sent by the user Tom to the user Tony by using the WeChat app of the mobile phone 10.

Therefore, to resolve an existing problem that a receiving sequence of a message is inconsistent with a sending sequence of the message in an IM app, this application provides a message order-preserving method.

Refer to FIG. 6 to FIG. 10A and FIG. 10B. The following describes a message order-preserving method provided in some embodiments of this application by using an example in which a first user performs a session by using an IM app of a mobile phone 10 and a second user that uses an IM app of a mobile phone 20.

Figure 6:
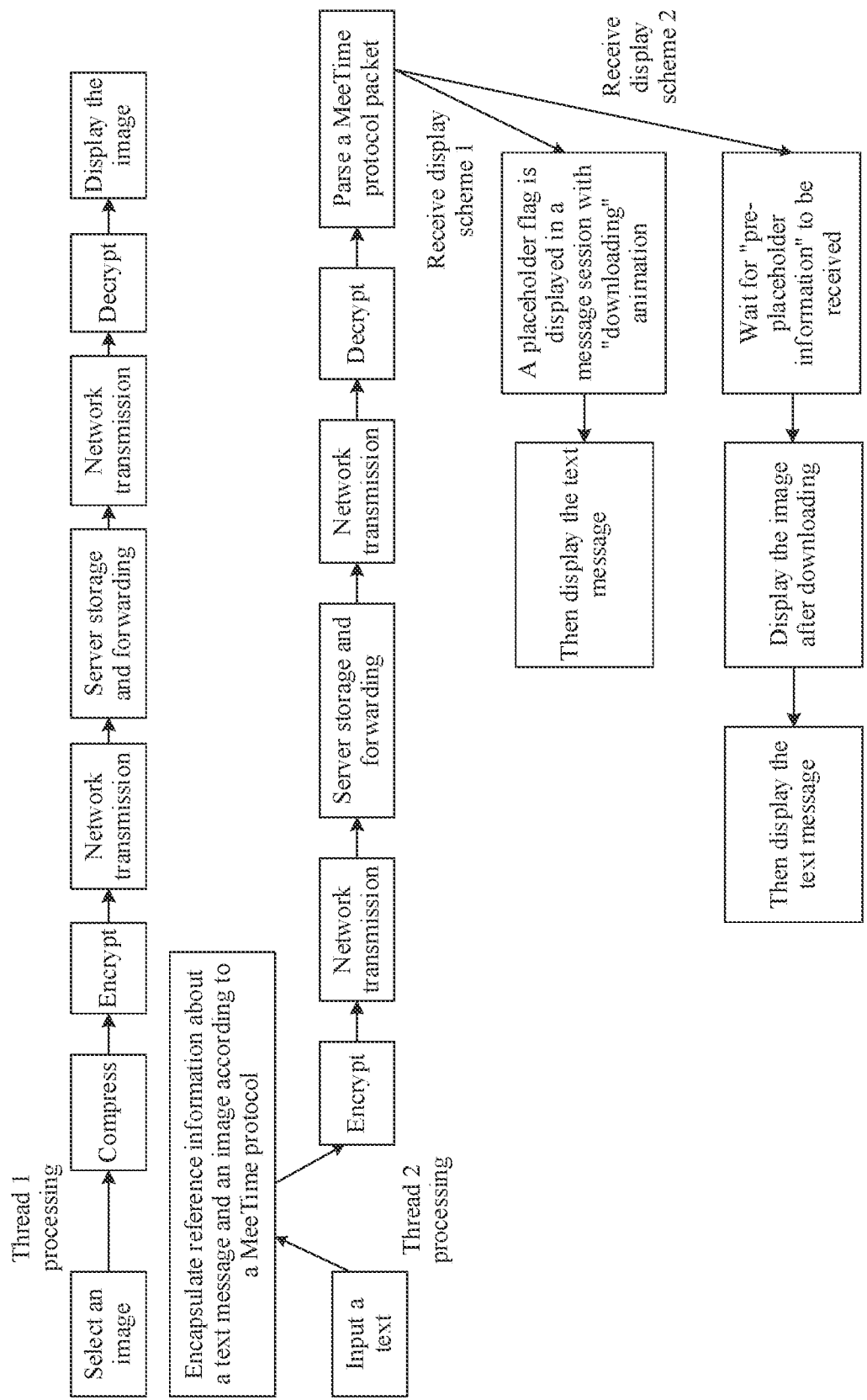
FIG. 6 shows a message processing flow of a mobile phone by using technical solutions of this application when a first user first sends an image and then sends a text message to a second user by using an IM app of the mobile phone according to some embodiments of this application.

In the embodiment shown in FIG. 6, a processing flow of the technical solution of this application is shown when the first user first selects a picture in the IM app of the mobile phone 10 and sends the picture to the second user, and then enters a text message in the IM app of the mobile phone 10 and sends the text message to the second user. That is, in this embodiment, the first user chooses to send the picture first, and then send the text message.

As shown in FIG. 6, when the mobile phone 10 processes the picture selected by the first user by using a thread 1, assuming that a data volume of the picture is large, the picture needs to be compressed and encrypted, and then transmitted to a server 30 through a network. The server 30 stores the picture and then transmits the picture to the mobile phone 20 through the network. The mobile phone 20 decrypts and displays received picture information.

However, when the mobile phone 10 processes, by using a thread 2, the text message sent by the first user, and when the data volume of the picture selected by the user is large, because time consumed in a process of compression, encryption, and network transmission of the picture is long, when the first user sends the text message, sending of the picture is not completed. Therefore, by performing the message order-preserving method provided in some embodiments of this application, before sending the text message input by the first user, the mobile phone 10 first sends the text message and reference information of a previous message (that is, the picture) to the second user.

Figure 9A:
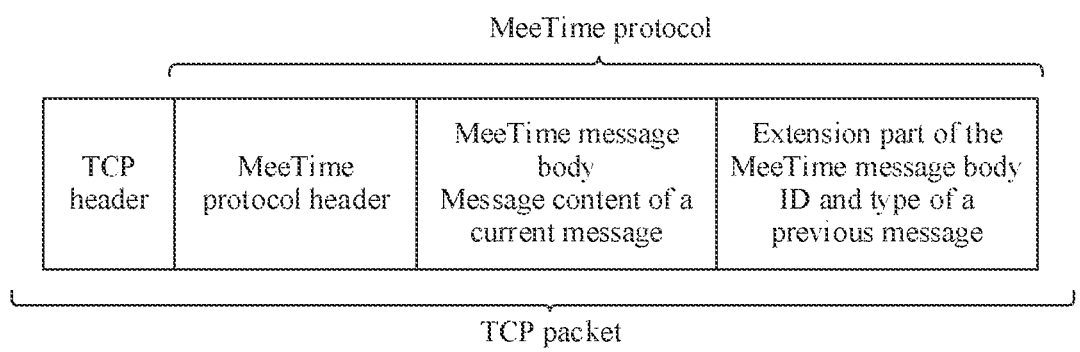
FIG. 9(a) is a schematic block diagram of a MeeTime protocol according to some embodiments of this application.
Figure 9B:
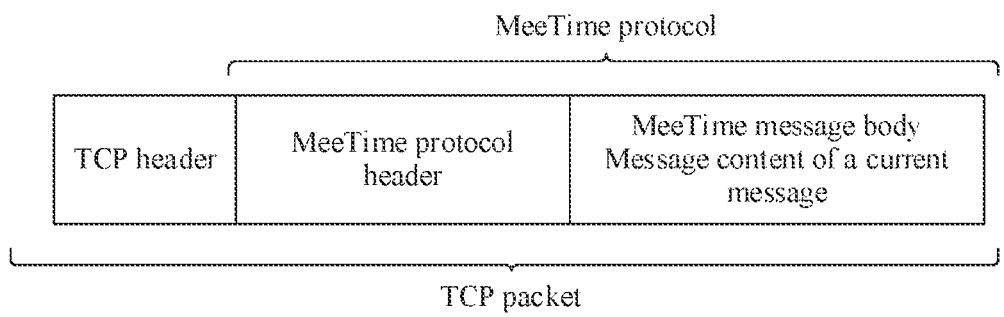
FIG. 9(b) is a schematic block diagram of another MeeTime protocol according to some embodiments of this application.

For example, in some embodiments, the mobile phone 10 encapsulates, according to a MeeTime protocol format shown in FIG. 9(*a*), the text message sent by the first user, to obtain a MeeTime protocol packet into which the text message is encapsulated, and then transmits the encapsulated MeeTime protocol packet to the mobile phone 20 through a network. After receiving the MeeTime protocol packet encapsulated with the text message, the mobile phone 20 held by the second user parses the packet, and after determining that the text message encapsulated in the packet carries the reference information of the previous message (that is, the picture), the mobile phone 20 displays pre-placeholder information of the picture in a message session of the IM app, and then displays the text message. The pre-placeholder information of the picture displayed by the mobile phone 20 in the message session of the IM app is information used to prompt the second user that the picture is being downloaded. For example, the mobile phone 20 first displays a thumbnail of the picture or displays an animation of "downloading" in the message session of the IM app, and then displays the text message. Alternatively, after the picture is received, the picture is first displayed, and then the text message is displayed.

In addition, it may be understood that the MeeTime protocol in embodiments of this application is a protocol specification applicable to a MeeTime application (Application, APP). In another embodiment of this application, when the user uses another application to perform a session, another protocol specification applicable to the application used by the user may be further used to encapsulate a message sent by the user.

Figure 7A:
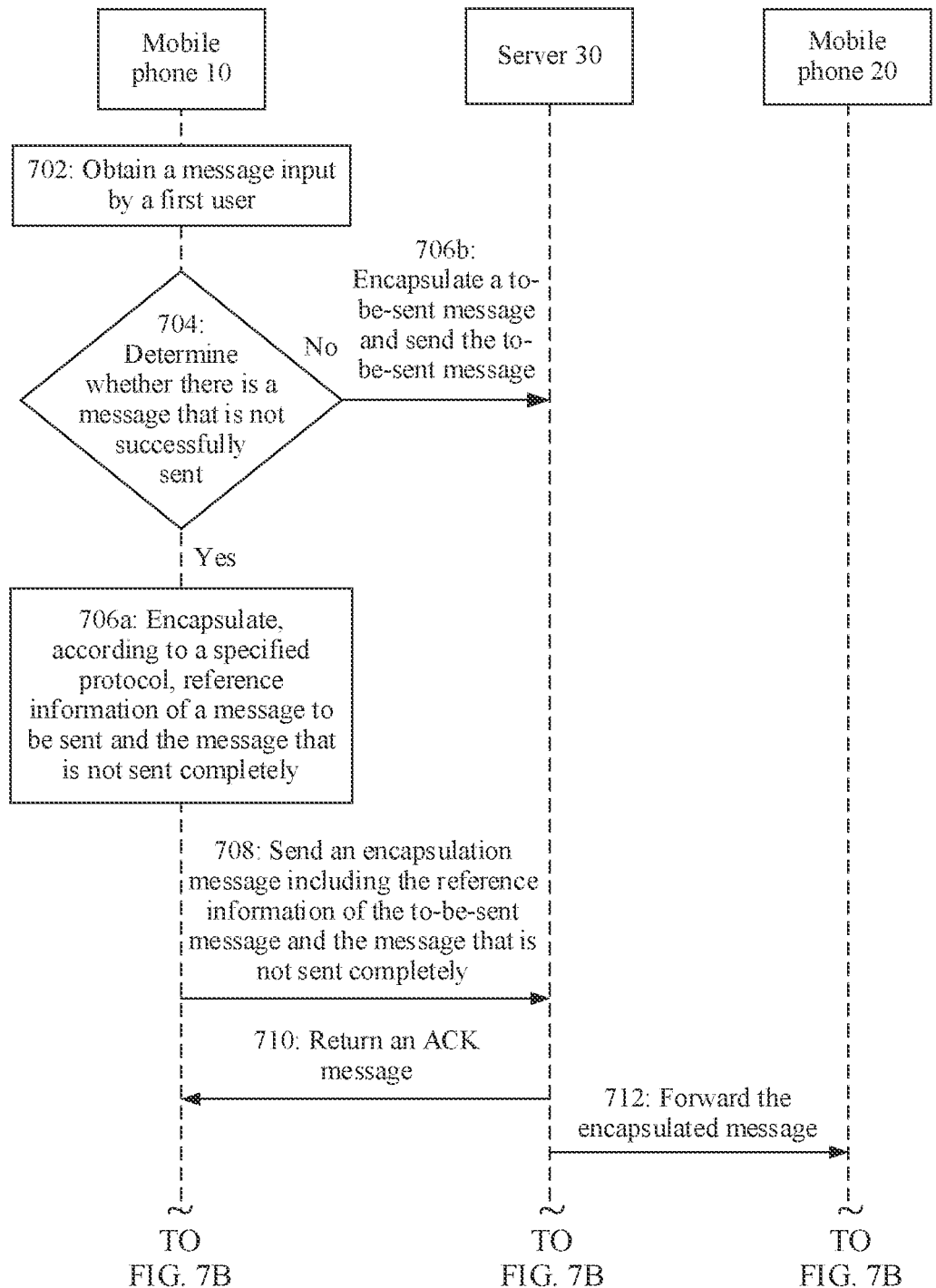
FIG. 7A and FIG. 7B are a block diagram of a flow of a message order-preserving method according to some embodiments of this application.
Figure 7B:
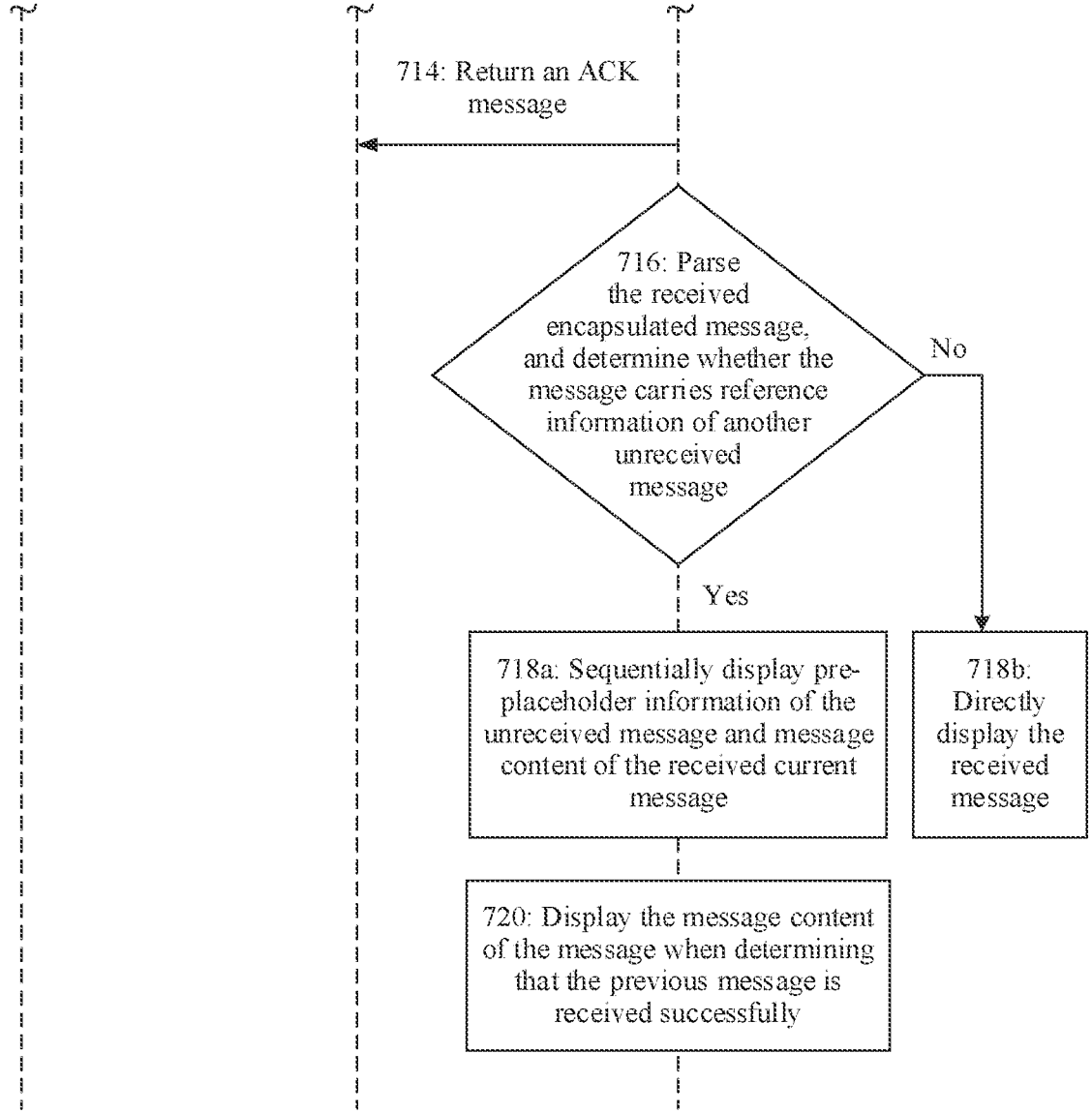

For the embodiment shown in FIG. 6, FIG. 7A and FIG. 7B are an interaction diagram of completing information transmission between a mobile phone 10, a server 30, and a mobile phone 20. As shown in FIG. 7A and FIG. 7B, in the embodiment shown in FIG. 6, a processing flow of handling a message by using the message order-preserving method provided in embodiments of this application includes the following steps.

Step 702: The mobile phone 10 obtains a message input by a first user. For example, in some embodiments, a processor of the mobile phone 10 obtains, from a software development kit (Software Development Kit, SDK) module of the mobile phone 10 through an application programming interface (Application Programming Interface, API), message content input by the first user in an IM app of the mobile phone 10.

Figure 8A:
FIG. 8(a) is a diagram of a desktop of a mobile phone held by a first user according to some embodiments of this application.
Figure 8B:
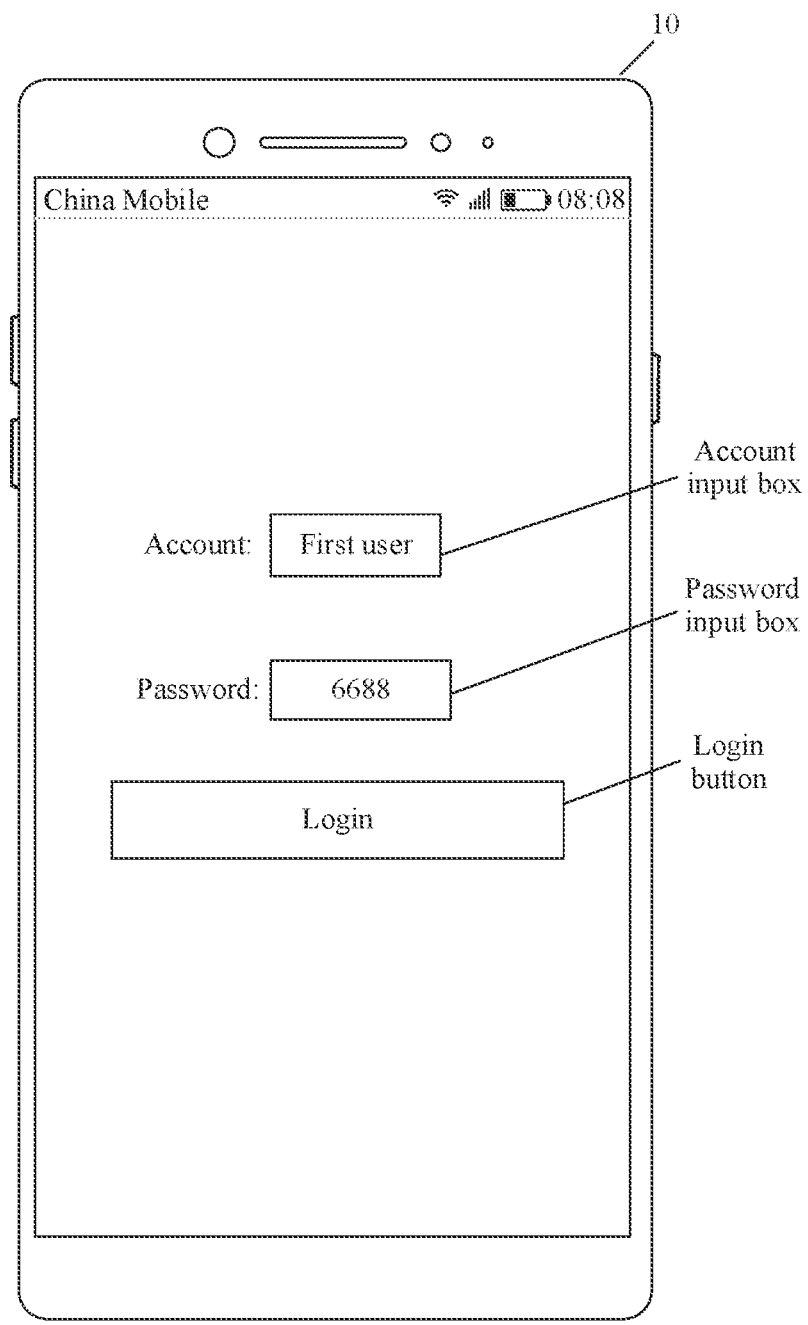
FIG. 8(b) is a login interface of an IM app of a mobile phone held by a first user according to some embodiments of this application.
Figure 8C:
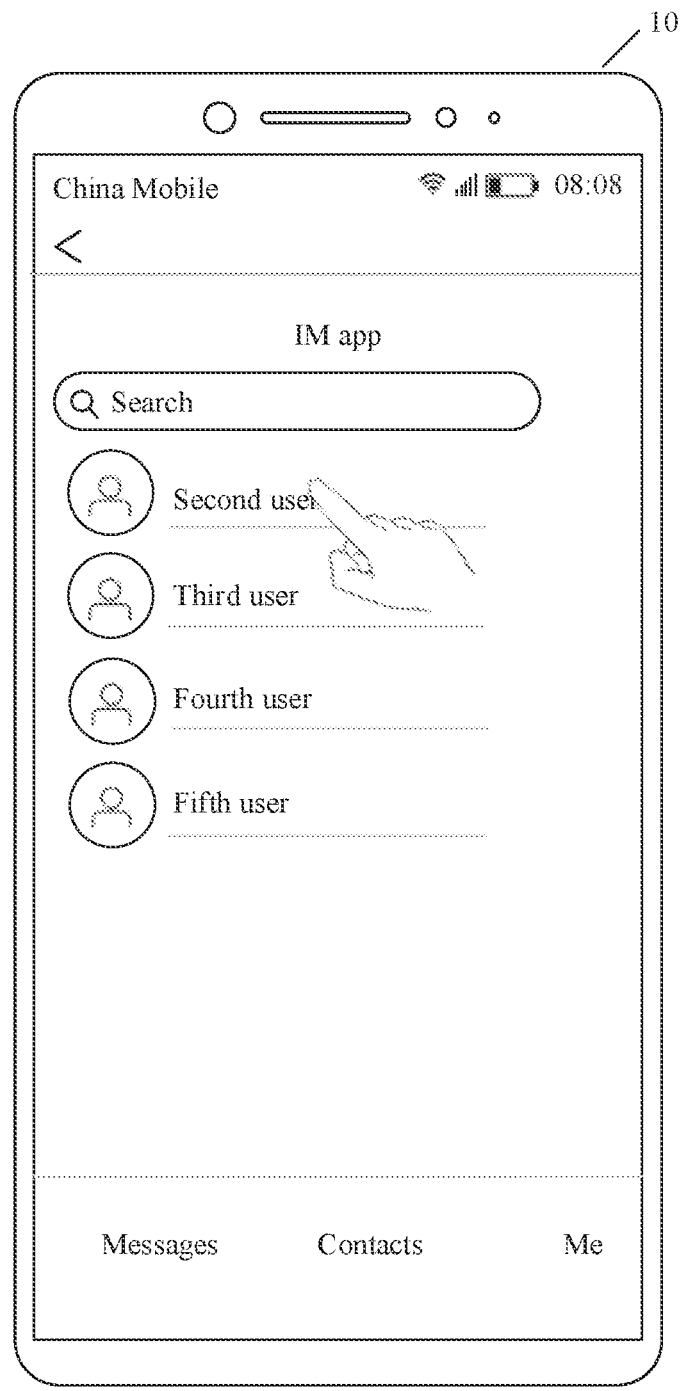
FIG. 8(c) is a contact interface of a first user after the first user logs in to an IM app of a mobile phone according to some embodiments of this application.
Figure 8D:
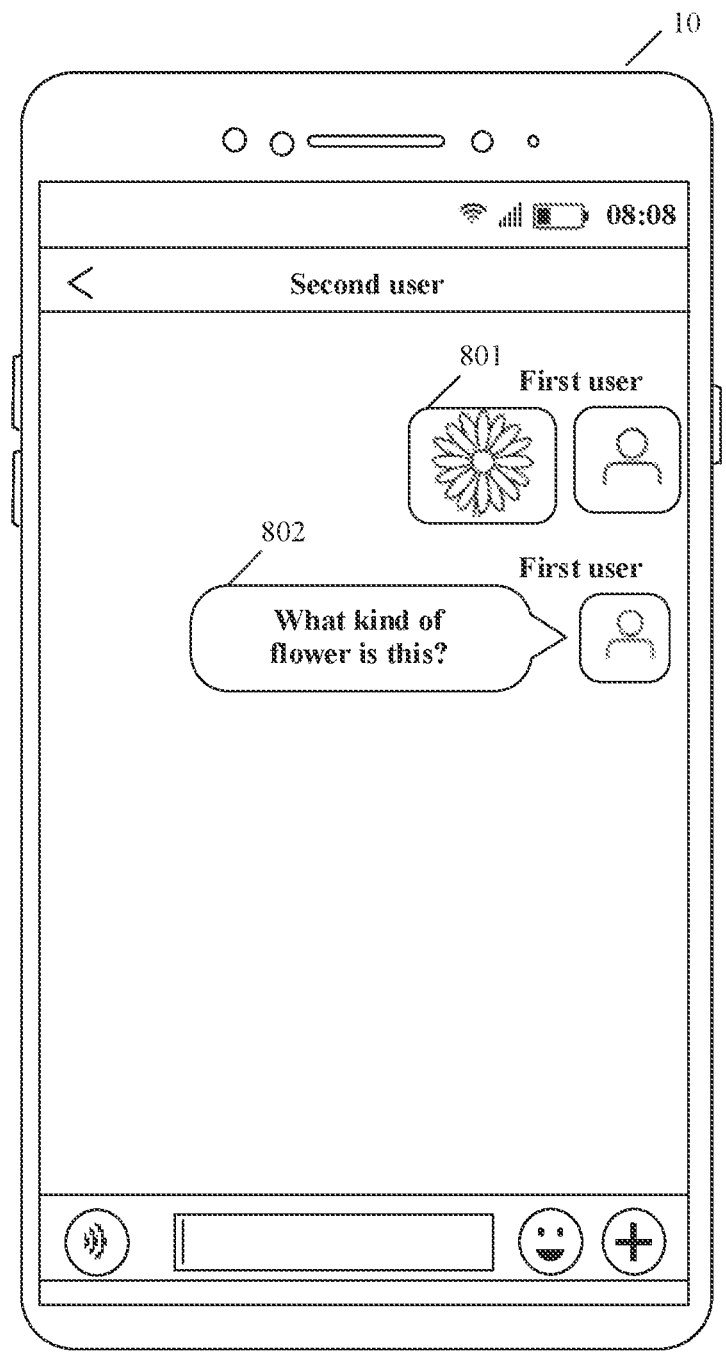
FIG. 8(d) shows an interface of a session performed between a first user and a second user through an IM app according to some embodiments of this application.

For example, in the embodiment shown in FIG. 8(a), after the first user taps an icon 11 of the IM app on a desktop of the mobile phone 10, the mobile phone 10 starts the IM app, and displays a login interface of the IM app shown in FIG. 8(b). After the first user enters an account in an account input box on the login interface of the IM app, enters a password in a password input box, and taps a login button, the mobile phone 10 displays a contact interface of the IM app of the first user shown in FIG. 8(c). The first user taps a profile picture of a second user from contacts of the second user, a third user, a fourth user, and a fifth user shown in FIG. 8(c), and selects the second user to perform a session. In this case, the mobile phone 10 displays an interface diagram of a session between the first user and the second user shown in FIG. 8(d). As shown in FIG. 8(d), the first user first selects a flower picture 801 in a dialog box of the IM app and sends the flower picture 801 to the second user, and then enters, in the dialog box of the IM app, a text message 802 "What kind of flower is this".

Step 704: When sending a current to-be-sent message, the mobile phone 10 determines whether there is a message that is not sent completely.

If a determining result is yes, it indicates that when the mobile phone 10 sends the current to-be-sent message, there is still a message that is not sent completely, and step 706a is performed. If a determining result is no, it indicates that when the mobile phone 10 sends the current to-be-sent message, there is no message that is not sent completely, and step 706b is performed.

For example, as described above, the first user first selects the flower picture 801 in the dialog box of the IM app and sends the flower picture 801 to the second user, and then enters, in the dialog box of the IM app, the text message 802 "What kind of flower is this". When sending the text message 802, the mobile phone 10 determines whether the flower picture 801 is successfully sent.

It should be noted that after each message entered by the user in the IM app of the mobile phone 10 is sent by the mobile phone 10 through a network, the mobile phone 10 generates a recorded message of the IM app, and stores the recorded message in a local database of the IM app. The database of the IM app stores information such as message content, a status flag indicating whether the message is successfully sent, an ID of the message, and a type of the message. The ID of the message may be, for example, a 32-bit unique character string obtained through hashing by using an SHA256 hash algorithm. The type of the message may be an image, a text, a file, a video, an audio, or the like. For example, a type field TYPE=1 of the message corresponds to a text type, TYPE=2 corresponds to an image type, TYPE=3 corresponds to a video type, TYPE=4 corresponds to an audio type, and the like.

In some embodiments, after sending a message to a server 30, and receiving an acknowledgment (Acknowledgement, ACK) character for a message from the server 30, the mobile phone 10 sets a sending status flag, for example, Status, corresponding to the message stored in the local database of the IM app to 1; otherwise, if no acknowledgment character for a message is received, the mobile phone 10 sets a sending status flag, for example, Status, of the message to 0.

In some embodiments, before sending a message, the mobile phone 10 has not sent a previous message from local. For example, assuming that a data volume of a previous message is large, before sending a current message, the mobile phone 10 determines that the previous message has not been compressed, that is, the previous message is still in a local processing state of the mobile phone 10. In this case, the mobile phone 10 sets a sending status flag that is corresponding to the previous message and that is stored in the local database of the IM app to 0.

For example, as shown in FIG. 8(d), before sending the text message 802 "What kind of flower is this", the mobile phone 10 checks a recorded message in the local database of the IM app. If the mobile phone 10 determines that a sending status flag Status of a message whose message ID is 00000000.00000000.00000000.00000001 and message type field TYPE=2 is 0, the mobile phone 10 determines that sending of a message 803 whose type is "picture" is not completed: otherwise, if a sending status flag Status of the message is 1, the mobile phone 10 determines that the message 803 whose type is "picture" has been sent.

It may be understood that definitions of the ID of the message, the message type field, and the sending status flag of the message in this embodiment of this application are merely examples for description. This is not limited in this application.

Step 706a: The mobile phone 10 encapsulates, according to a specified protocol format, reference information of a message to be sent and a message that is not sent completely. For example, content of the to-be-sent message and ID information and type information of the message that is not sent completely are encapsulated according to the specified protocol format. In addition, at least one of the content of the to-be-sent message, or the ID information or the type information of the message that is not sent completely may be encapsulated according to a specified protocol. The content of the to-be-sent message and other information (for example, a sending time) of the message that is not sent completely may be further encapsulated. Any identifier that can indicate that there is a previous message that is not sent completely may be used in the technical solutions of this application. This is not limited herein.

The specified protocol format may be a binary protocol shown in FIG. 9(a). For brevity of description, the binary protocol is referred to as a MeeTime protocol for short in the following. It may be understood that the MeeTime protocol shown in FIG. 9(a) is merely an example protocol specification applicable to a MeeTime app. In another embodiment of this application, a message entered by the user may be further encapsulated by using a protocol specification applicable to another IM app. This is not limited in this application.

In the embodiment shown in FIG. 9(a), the MeeTime protocol includes a MeeTime protocol header, a MeeTime message body, and an extension part of the MeeTime protocol body. The MeeTime message body includes message content of the foregoing to-be-sent message. For example, in some embodiments, the MeeTime message body includes a to-be-sent text message 802 "What kind of flower is this". The extension part of the MeeTime protocol body may include the reference information of the foregoing message that is not sent completely. For example, in some embodiments, the extension part of the MeeTime protocol body includes the ID information and the type information of the foregoing message that is not sent completely. For example, the extension part of the MeeTime protocol body includes that an ID of a message that is not sent completely is 00000000.00000000.00000000.00000001, and a type is TYPE=2. The MeeTime protocol header includes an ID and type information that represent whether the protocol carries a previous message that is not sent completely. For example, in some embodiments, the MeeTime protocol header includes a 1-bit status bit Control. When Control=0, it indicates that the protocol does not carry the ID and the type information of the previous message that is not sent completely. When Control=1, it indicates that the protocol carries the ID and the type information of the previous message that is not sent completely.

It may be understood that lengths of fields in the protocol header, the message body, and the extension part of the MeeTime protocol, and meanings of each bit and each byte may be defined by a developer. This is not limited in this application. For example, in some embodiments, the protocol header of the MeeTime protocol further includes a 2-byte length field that represents a length of the MeeTime protocol, a 2-byte version field that represents a version number of the MeeTime protocol, and the like. For another example, in some embodiments, the message body of the MeeTime protocol further includes a 32-bit ID of a to-be-sent message, 2-byte type information of the to-be-sent message, and the like.

In addition, it may be understood that, to ensure reliable transmission of a message in a network, the mobile phone 10 encapsulates, according to the foregoing MeeTime protocol format, the to-be-sent message and the ID information and the type information of the current message that is not sent completely, to obtain a MeeTime protocol packet, and then encapsulates the MeeTime protocol packet according to a transmission control protocol (Transmission Control Protocol, TCP), to obtain a TCP packet shown in FIG. 9(*a*). In some embodiments, the mobile phone 10 may alternatively encapsulate the MeeTime protocol packet according to a user datagram protocol (User Datagram Protocol, UDP). A specific transmission protocol used to transmit a message is not limited in this application.

In addition, it may be understood that, to prevent a message from being intercepted in a sending process, the message is usually encrypted. For example, in the TCP packet shown in FIG. 9(*a*), the mobile phone 10 may first encrypt, by using an advanced encryption standard (Advanced Encryption Standard, AES) key, a TCP data part, that is, the MeeTime protocol packet, other than a TCP header, and then encrypt, by using an RSA (an encryption algorithm) public key, the AES key.

Step 706*b*: The mobile phone 10 encapsulates the to-be-sent message and sends the to-be-sent message.

It may be understood that, in some embodiments, before sending the to-be-sent message, the mobile phone 10 may encapsulate the to-be-sent message according to the specified protocol format, and then send the encapsulated message. For example, the mobile phone 10 sends the encapsulated message to the server 30 through a cellular network, a local area network, or the like. The specified protocol format may be a MeeTime protocol shown in FIG. 9(*b*). A difference between the MeeTime protocol shown in FIG. 9(*b*) and the MeeTime protocol shown in FIG. 9(*a*) lies in that: the MeeTime protocol shown in FIG. 9(*b*) includes only the MeeTime protocol header and the MeeTime message body, and does not include an extension field. Definitions of the MeeTime protocol header and the MeeTime message body are similar to definitions of the MeeTime protocol header and the MeeTime message body in the MeeTime protocol shown in FIG. 9(*a*). Details are not described herein again.

Step 708: The mobile phone 10 sends an encapsulation message including the reference information of the to-be-sent message and the message that is not sent completely.

For example, the mobile phone 10 sends the encapsulated message to the server 30 through a cellular network, a local area network, or the like. Specifically, for example, the mobile phone 10 encapsulates, according to the MeeTime protocol format shown in FIG. 9(*a*), the content of the to-be-sent text message 802 "What kind of flower is this" that is entered by the first user by using the IM app of the mobile phone 10, the message ID: 00000000.00000000.00000000.00000002, the message type TYPE=1, and the message ID: 00000000.00000000.00000000.00000001, the message type TYPE=2 of the previous message 801 (that is, an image of a flower), and sets a Control field in the MeeTime protocol header to 1. Then, the TCP protocol is used to transmit the encapsulated MeeTime protocol packet.

Step 710: The server 30 returns an ACK message to the mobile phone 10.

The ACK message is used to notify the mobile phone 10 that the server 30 has received the message sent by the mobile phone 10. For example, after receiving the ACK message sent by the server 30, the mobile phone 10 sets the sending status flag, for example, Status, of the text message 802 that is stored in the local database of the IM app and that corresponds to "What kind of flower is this?" to 1, to indicate that the message has been successfully sent.

Step 712: The server 30 forwards the encapsulated message to the mobile phone 20.

In some embodiments, after locally storing the message sent by the mobile phone 10, the server 30 forwards the message to the mobile phone 20 through the cellular network, the local area network, or the like. For example, after receiving the TCP packet of the text message 802 that is sent by the mobile phone 10 and that is "What kind of flower is this", the server 30 forwards the TCP packet of the text message 802 "What kind of flower is this" to the mobile phone 20. In some embodiments, the server 30 may further parse the packet sent by the mobile phone 10, and store content of a data part of the packet in the local database, so that a developer or a user analyzes data stored in the server.

Step 714: After receiving the encapsulated message, the mobile phone 20 returns an ACK message to the server 30, to notify the server 30 that the mobile phone 20 has received the message sent by the server 30.

Step 716: The mobile phone 20 parses the received encapsulated message, and determines whether the message carries reference information of another unreceived message.

If a determining result is yes, it indicates that the message carries the reference information of the another unreceived message, and step 718*a* is performed; if a determining result is no, it indicates that the message does not carry the reference information of the another unreceived message, and step 718*b* is performed.

For example, in some embodiments, the mobile phone 20 parses the received TCP packet, and determines that a value of a Control field in a data part of the TCP packet is 1, that is, a value of a status bit that is in the protocol header of the MeeTime protocol and that indicates whether the protocol carries the ID and type information of the previous uncompleted message is 1, and then determines that the data part of the received TCP packet carries the ID and type information of the previous unreceived message, in this way, it is determined that a previous message that is not received exists before the current message received by the mobile phone 20. On the contrary, if the value of the Control field is 0, that is, the value of the status bit that is in the protocol header of the MeeTime protocol and that indicates whether the protocol carries the ID and type information of the previous message that is not sent completely is 0, it is determined that all messages before the current message received by the mobile phone 20 are received.

For example, the mobile phone 20 parses the received TCP packet, and determines that a value of a Control field in a MeeTime protocol packet corresponding to the message 802 whose message content is "What kind of flower is this", message ID is 00000000.00000000.00000000.00000002 and message type TYPE=1 is 1, and then determines that a value of an extension part of the MeeTime protocol packet of the message is not 0. Then, the extension part of the MeeTime protocol packet of the message is parsed, and it is determined that a message ID carried in the extension part is 00000000.00000000.00000000.00000001 and a message type TYPE=2, to determine that the picture 801 whose message ID is 00000000.00000000.00000000.00000001 is still not received.

It may be understood that, in some embodiments, before sending a message, the mobile phone 10 performs encryption processing on a TCP data part (that is, the MeeTime protocol packet) in the TCP packet other than the TCP header. Therefore, after receiving the TCP packet forwarded by the server 30, the mobile phone 20 needs to perform decryption processing on the TCP packet, and then parse the decrypted TCP packet.

Step 718a: The mobile phone 20 sequentially displays pre-placeholder information corresponding to the unreceived message and the received current message.

The pre-placeholder information is used by the mobile phone 20 to first occupy a location on a session interface of the IM app of the mobile phone 20 for a message that is not received. That is, even if the mobile phone 20 does not receive a message, the mobile phone 20 may first display, on the session interface of the IM app, the pre-placeholder information corresponding to the message at a display location of the message.

Figure 8E:
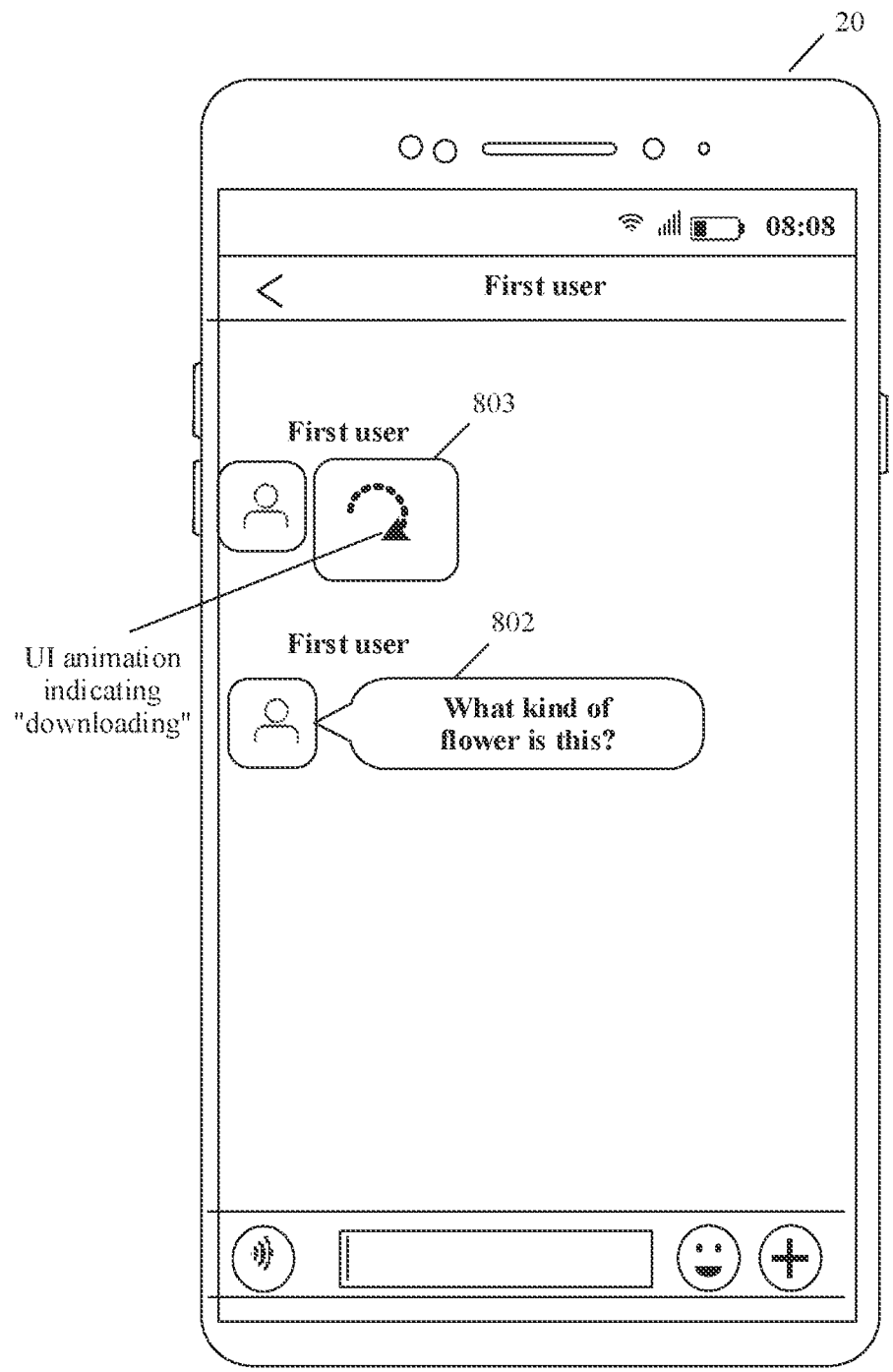
FIG. 8(e) shows an interface on which a picture is being downloaded in a message sent by a first user and received by a second user according to some embodiments of this application.
Figure 8F:
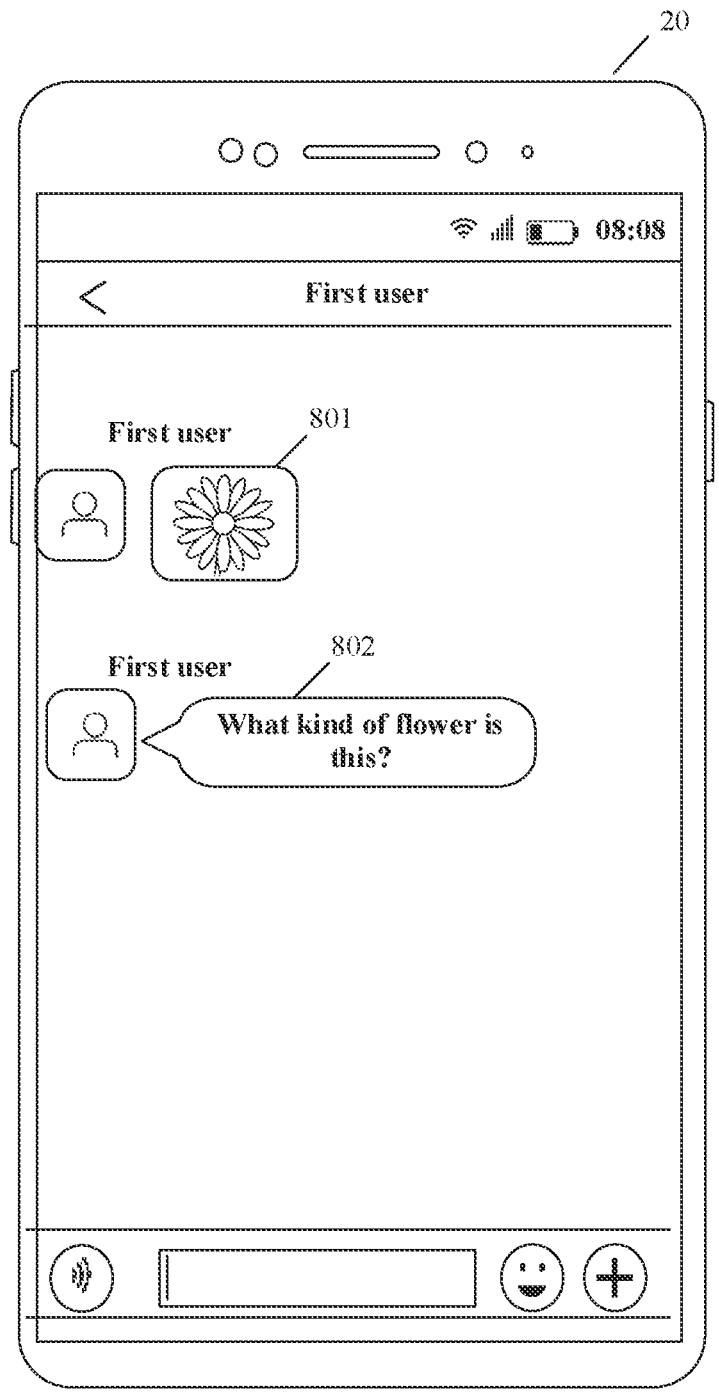
FIG. 8(f) shows an interface on which a second user receives a picture message and a text message sent by a first user according to some embodiments of this application.

In some embodiments, the pre-placeholder information may be, for example, a semicircle user interface (User Interface, UI) animation 803 indicating that a picture message 801 is being downloaded in FIG. 8(e).

In some embodiments, the pre-placeholder information may alternatively be a thumbnail of an image, a first frame picture of a video, or the like. In some embodiments, the pre-placeholder information may alternatively be a combination of the thumbnail of the picture and the UI animation that indicates that the message is being downloaded, a combination of the first frame picture of the video and the UI animation that indicates that the message is being downloaded, or the like.

It should be noted that after receiving a message, the mobile phone 20 first stores the received message in the local database of the IM app. A sequence of messages displayed on the session interface of the IM app by the mobile phone 20 is consistent with a sequence in which received messages are written into the local database of the IM app. That is, a message that is first written into the database is first displayed, and a message that is later written into the database is then displayed. Therefore, after the mobile phone 20 receives a message, if the mobile phone 20 determines that the previous message (for example, the picture or the video) is not received, the mobile phone 20 may not write the current message first, and pre-placeholder information of the previous message is first displayed in a message session of the IM app, and then content of the current message is written. In this case, the IM app message session interface of the mobile phone 20 first displays the pre-placeholder information of the previous message, and then displays the content of the current message.

For example, in the embodiment shown in FIG. 8(e), in the TCP packet corresponding to the received text message 802 "What kind of flower is this" that is determined by the mobile phone 20, an extension part in the data part (that is, the MeeTime protocol packet) of the TCP carries a message ID 00000000.00000000.00000000.00000001 and a message type TYPE=2. To be specific, if it is determined that the previous picture message 801 is not received, after the thumbnail of the picture is downloaded, the mobile phone 20 first displays the thumbnail of the picture on a session interface of a second user and a session interface of a first user, displays, in a center of the thumbnail, a semicircle UI animation that indicates that the picture is being downloaded as shown in FIG. 8(e), and then displays, under the thumbnail of the picture, the received text message 802 "What kind of flower is this". In this way, a sequence of the messages that are from the first user and that are viewed by the second user on the session interface of the IM app that is logged in to on the mobile phone 20 is consistent with a sequence of the messages that are sent by the first user in a dialog box of the IM app of the mobile phone 10 as shown in FIG. 8(d). This improves user experience on using the IM app.

Step 718b: The mobile phone 20 directly displays the received message.

For example, in some embodiments, if the mobile phone 20 determines, in the TCP packet corresponding to the received text message 802 "What kind of flower is this", that a value of a Control field in the data part of the TCP packet is 0, that is, a value of a status bit that represents whether the protocol carries an ID and type information of the previous message that is not sent completely in the protocol header of the MeeTime protocol is 0, the mobile phone 20 directly displays the text message 802 "What kind of flower is this" on the IM app.

Step 720: The mobile phone 20 displays message content of the message when determining that receiving of the previous unreceived message is completed. For example, in the embodiment shown in FIG. 8(f), after receiving the previous flower picture message 801 of the text message 802 "What kind of flower is this", the mobile phone 20 completely displays the flower picture.

With reference to FIG. 8(a) to FIG. 10B, the following describes in detail another processing flow in which the mobile phone 10 and the mobile phone 20 perform message handling by using the message order-preserving method provided in embodiments of this application when the first user first selects a picture in the IM app of the mobile phone 10 and sends the picture to the second user, and then enters a text message in the IM app of the mobile phone 10 and sends the text message to the second user.

Figure 10A:
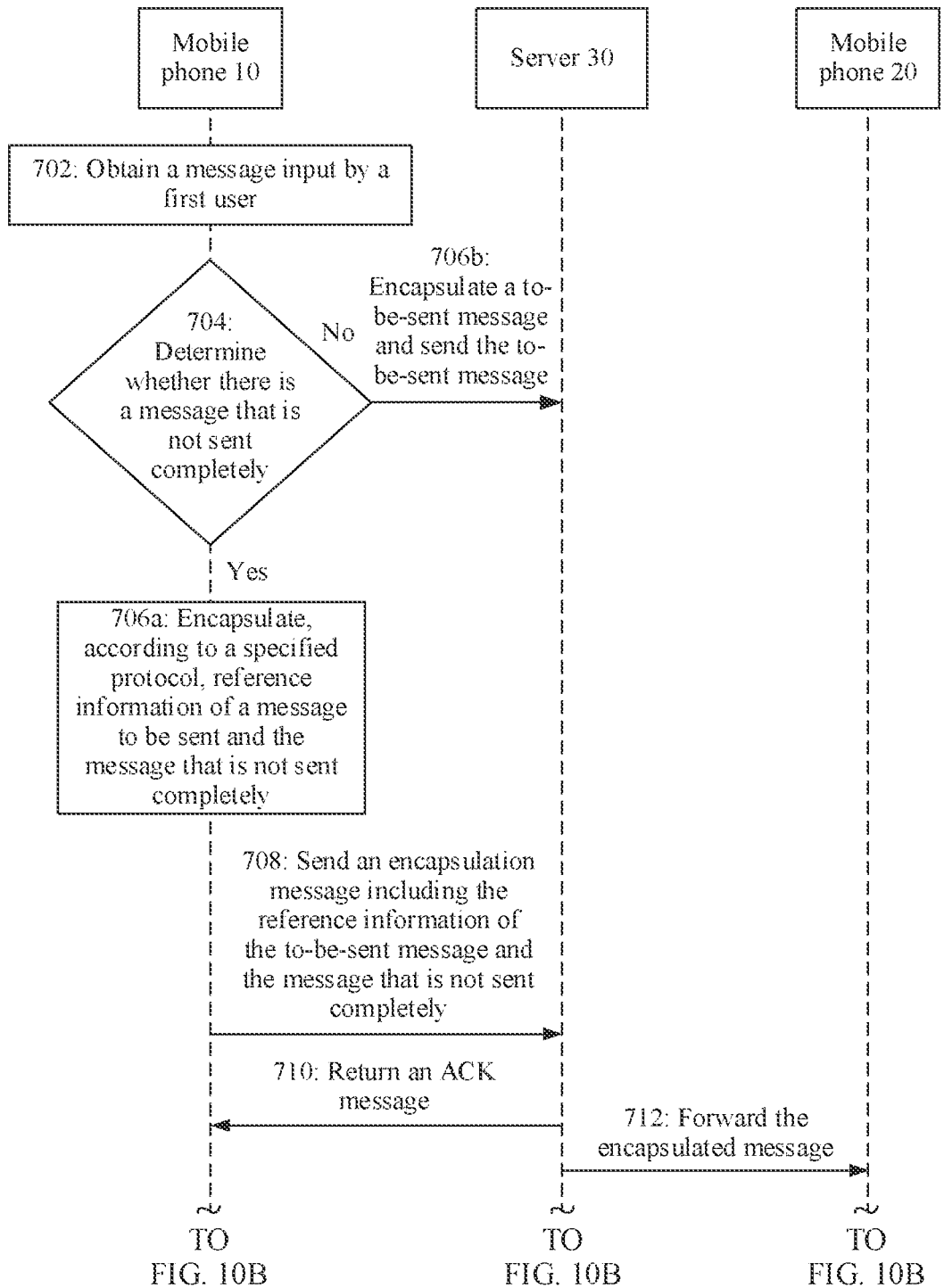
FIG. 10A and FIG. 10B are a block diagram of another flow of a message order-preserving method according to some embodiments of this application.
Figure 10B:
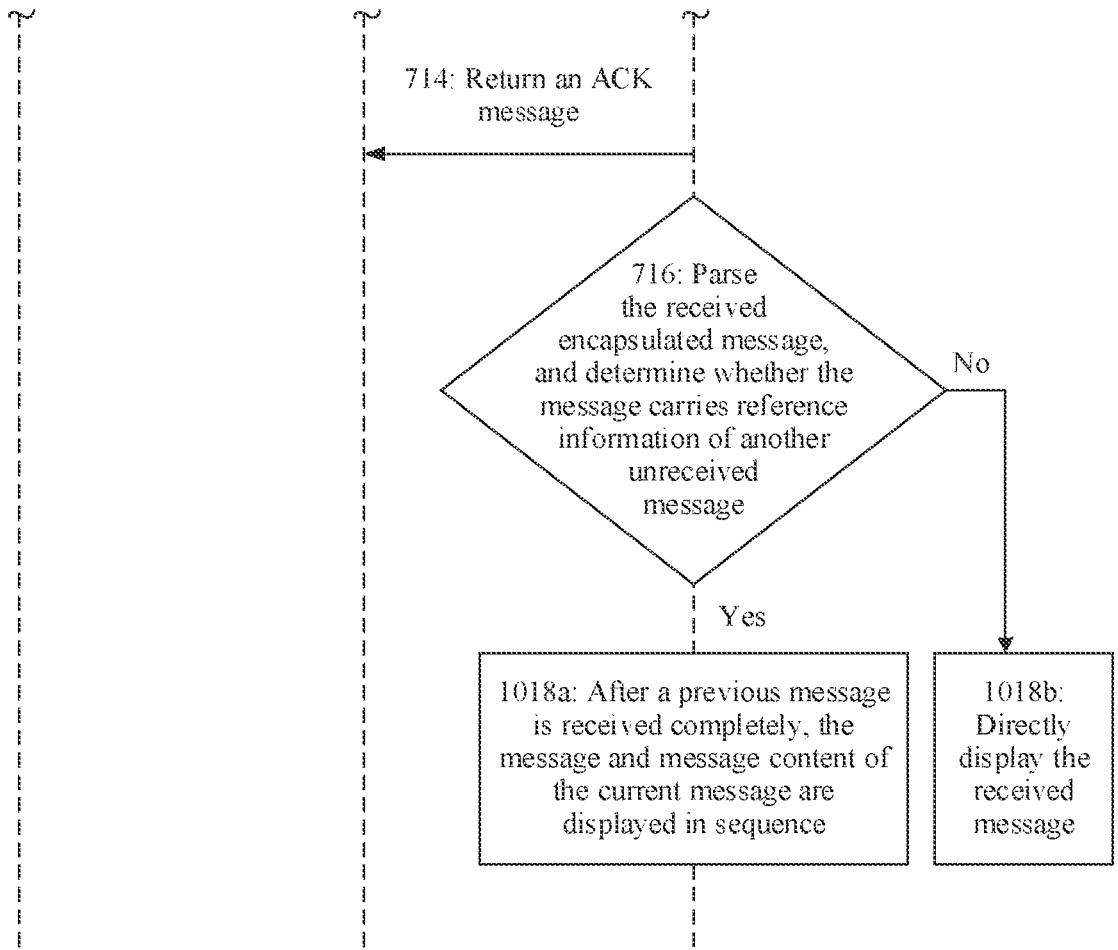

A processing flow of the message order-preserving method provided in the embodiment shown in FIG. 10A and FIG. 10B is similar to a processing flow of the message order-preserving method provided in the embodiment shown in FIG. 7A and FIG. 7B, and a difference lies only in that:

in the procedure shown in FIG. 7A and FIG. 7B, when determining that a previous message is not received before the current message is received, the mobile phone 20 first displays the previous message in a form of pre-placeholder information on a session interface of the IM app, and then displays content of the received message. After the previous message is received, the mobile phone 20 displays complete content of the message. However, in the procedure shown in FIG. 10A and FIG. 10B, when determining that a previous message is not received before the current message is received, the mobile phone 20 first does not display the current message, and after the previous message is received, displays the previous message and the current message in sequence. For example, in some embodiments, after receiving the current message, the mobile phone 20 waits for a period of time, and after receiving of the previous message is also completed, first displays the previous message on the session interface of the IM app, and then displays the current message. For another example, in some embodiments, after receiving the current message, the mobile phone 20 waits for a period of time, and then displays the previous message and the current message at the same time after receiving of the previous message is also completed. The previous message is located above the current message on the session interface of the IM app.

It should be noted that, because a processing flow of the message order-preserving method shown in FIG. 10A and FIG. 10B is similar to the procedure shown in FIG. 7A and FIG. 7B, for brevity of description, steps that are in FIG. 10A and FIG. 10B and that are the same as those in FIG. 7A and FIG. 7B are not described again. The following describes only steps that are in FIG. 10A and FIG. 10B and that are different from those in FIG. 7A and FIG. 7B in detail.

Specifically, as shown in FIG. 10A and FIG. 10B, after the mobile phone 20 parses the received encapsulated message and determines that the encapsulated message carries reference information of other unreceived messages, step 1018a is performed; otherwise, after the mobile phone 20 parses the received encapsulated message and determines that the encapsulated message does not carry reference information of other unreceived messages, step 1018b is performed.

For example, in some embodiments, if the mobile phone 20 determines, by parsing the data part of the received TCP packet, that the value of the Control field in the data part of the TCP packet is 1, it is determined that there is a previous message that is not received before the current message received by the mobile phone 20. On the contrary, if the mobile phone 20 determines that the value of the Control field in the data part of the TCP packet is 0, it is determined that there is no message that is not received by the mobile phone 20. For a specific determining method, refer to the foregoing description of step 716 in FIG. 7A and FIG. 7B. Details are not described herein again.

Step 1018a After receiving the unreceived message, the mobile phone 20 displays the message and message content of the current message in sequence.

In some embodiments, after receiving a message, the mobile phone 20 first stores the received message in the local database of the IM app. A sequence of messages displayed on the session interface of the IM app by the mobile phone 20 is consistent with a sequence in which received messages are written into the local database of the IM app. That is, a message that is first written into the database is first displayed, and a message that is later written into the database is then displayed. Therefore, after receiving a message, if the mobile phone 20 determines that the previous message (for example, an image or a video) is not received, the mobile phone 20 may not write the current message first, and after the previous message is received, the mobile phone 20 sequentially writes the previous message and the current message into the local database of the IM app. Then, the content of the previous message and then the content of the current message are sequentially displayed on the message session interface of the IM app. For example, in the embodiment shown in FIG. 8(f), after sequentially displaying the flower picture message 801 on the session interface of the IM app, the mobile phone 20 then displays the text message 802 "What kind of flower is this". In this way, a sequence of the messages that are from the first user and that are viewed by the second user on the session interface of the IM app that is logged in to on the mobile phone 20 is consistent with a sequence of the messages that are sent by the first user in a dialog box of the IM app of the mobile phone 10 as shown in FIG. 8(d). This improves user experience on using the IM app.

Step 1018b: The mobile phone 20 directly displays the received message.

For example, in some embodiments, if the mobile phone 20 determines, in the TCP packet corresponding to the received text message 802 "What kind of flower is this", that a value of a Control field in a data part of the TCP packet is 0, that is, a value of a status bit that represents whether the protocol carries an ID and type information of the previous message that is not sent completely is 0 in the protocol header of the MeeTime protocol, the mobile phone 20 directly displays the text message 802 "What kind of flower is this" on the IM app.

Embodiments of a mechanism disclosed in this application may be implemented in hardware, software, firmware, or a combination of these implementation methods. Embodiments of this application may be implemented as a computer program or program code executed in a programmable system. The programmable system includes at least one processor, a storage system (including a volatile memory, a nonvolatile memory, and/or a storage element), at least one input device, and at least one output device.

The program code may be configured to input instructions, to perform functions described in this application and generate output information. The output information may be applied to one or more output devices in a known manner. For a purpose of this application, a processing system includes any system that has a processor such as a digital signal processor (Digital Signal Processor, DSP), a microcontroller, an application-specific integrated circuit (Application-Specific Integrated Circuit, ASIC), or a microprocessor.

The program code may be implemented in a high-level procedural language or an object-oriented programming language, to communicate with the processing system. The program code may alternatively be implemented by using an assembly language or a machine language when needed. Actually, the mechanisms described in this application are not limited to a scope of any particular programming language. In any case, the language may be a compiled language or an interpretive language.

In some cases, the disclosed embodiments may be implemented by hardware, firmware, software, or any combination thereof. The disclosed embodiments may be alternatively implemented as instructions carried by or stored on one or more temporary or non-temporary machine-readable (for example, computer-readable) storage media, and the instructions may be read and executed by one or more processors. For example, the instructions may be distributed through a network or another computer-readable medium. Therefore, the machine-readable medium may include any mechanism for storing or transmitting information in a machine (for example, a computer)-readable form. The machine-readable medium includes but is not limited to a floppy disk, an compact disc, an optical disc, a compact disc read-only memory (CD-ROMs), a magneto-optical disc, a read-only memory (Read-Only Memory, ROM), random access memory (Random Access Memory, RAM), erasable programmable read-only memory (Erasable Programmable Read-Only Memory, EPROM), electrically erasable programmable read-only memory (Electrically Erasable Programmable Read-Only Memory, EEPROM), a magnetic or an optical card, a flash memory, or a tangible machine-readable memory that is configured to transmit information through Internet by using electricity, light, sound or another form of propagating signal (for example, carrier, an infrared signal, or a digital signal). Therefore, the machine-readable medium includes any type of machine-readable medium that is suitable for storing or transmitting electronic instructions or information in a machine (for example, a computer)-readable form.

In the accompanying drawings, some structural or method features may be shown in a particular arrangement and/or order. However, it should be understood that such a particular arrangement and/or order may not be required. In some embodiments, these features may be arranged in a manner and/or order different from that shown in the descriptive accompanying drawings. In addition, inclusion of the structural or method features in a particular figure does not imply that such features are required in all embodiments, and in some embodiments, these features may not be included or may be combined with other features.

It should be noted that all units/modules mentioned in the device embodiments of this application are logical units/modules. Physically, one logical unit/module may be one physical unit/module, or may be a part of one physical unit/module, or may be implemented by a combination of a plurality of physical units/modules. Physical implementations of these logical units/modules are not the most important, and a combination of functions implemented by these logical units/modules is a key to resolving technical problems proposed in this application. In addition, to highlight an innovative part of this application, a unit/module that is not closely related to resolving the technical problems proposed in this application is not introduced in the foregoing device embodiments of this application. This does not indicate that there is not another unit/module in the foregoing device embodiments.

It should be noted that, in examples and the specification of this patent, relational terms such as first and second are only used to distinguish one entity or operation from another entity or operation, and do not necessarily require or imply that any actual relationship or sequence exists between these entities or operations. Moreover, the terms "include" or any other variant thereof is intended to cover a non-exclusive inclusion, so that a process, a method, an article, or a device that includes a list of elements not only includes those elements but also includes other elements that are not expressly listed, or further includes elements inherent to such a process, method, article, or device. An element preceded by "includes a" does not, without more constraints, preclude the presence of additional identical elements in the process, method, article, or device that includes the element.

Although this application has been illustrated and described with reference to some preferred embodiments of this application, a person of ordinary skill in the art should understand that various changes may be made to this application in form and detail without departing from the spirit and scope of this application.

What is claimed is:

1. A method implemented by a first electronic device, wherein the method comprises:
   generating, by a first application of a first electronic device, a first message,
   starting sending the first message to a second electronic device;
   generating, by the first application, a second message for sending to the second electronic device after the first message; and
   sending to the second electronic device, response to determining that sending the first message is not completed, an integration message comprising the second message and a first identifier indicating that sending the first message is not completed,
   wherein the integration message instructs a second application of the second electronic device to display the first message and the second message, and
   wherein the first application and the second application correspond to a same application on the first electronic device and the second electronic device.

2. The method according to claim 1, wherein the first identifier comprises at least one of an identification (ID) or type information of the first message.

3. The method according to claim 1, wherein the first application comprises at least one of an instant messaging application, a live broadcast application, a video conference application, or an online education application.

4. The method according to claim 1, comprising sending the first message, the second message, or both using a server.

5. A method implemented by a second electronic device, wherein the method comprises:
   receiving an integration message from a first electronic device, wherein the integration message comprises a second message and a first identifier indicating that sending a first message prior to the second message is not completed, wherein the first message and the second message correspond to a first application of the first electronic device; and
   displaying the first message and the second message based on the integration message.

6. The method according to claim 5, wherein the first identifier comprises at least one of identifier (ID) information or type information of the first message.

7. The method according to claim 5, further comprising:
   displaying, after receiving the integration message, prompt information of the first message on a display interface of a second application on the second electronic device, wherein the first application and the second application correspond to a same application on the first electronic device and the second electronic device; and
   displaying the second message after the prompt information.

8. The method according to claim 7, further comprising:
   stopping, after determining that the first message is received, displaying the prompt information; and
   replacing the prompt information with the first message.

9. The method according to claim 7, wherein the prompt information comprises at least one of an image, a text, or an animation.

10. The method according to claim 7, further comprising:
    determining, that the integration message is received before the first message; and
    sequentially displaying the first message and the second message on a display interface of the second application.

11. The method according to claim 7, wherein the same application is an instant messaging application, a live broadcast application, a video conference application, or an online education application.

12. The method according to claim 5, further comprising: receiving the first message, the second message or both using a server.

13. A second electronic device, comprising:
    one or more processors; and
    one or more memories coupled to the one or more processors and configured to store instructions that, when executed by the one or more processors, cause the second electronic device to:
        receive an integration message from a first electronic device, wherein the integration message comprises a second message and a first identifier indicating that sending of a first message prior to the second message is not completed, wherein the first message and the second message correspond to a first application of the first electronic device; and
        display the first message and the second message according to sending order based on the integration message.

14. The second electronic device according to claim 13, wherein the first identifier comprises at least one of identification (ID) information or type information of the first message.

15. The second electronic device according to claim 13, wherein, when executed by the one or more processors, the instructions further cause the second electronic device to display prompt information of the first message on a display interface of a second application on the second electronic device, wherein the first application and the second application correspond to a same application on the first electronic device and the second electronic device.

16. The second electronic device according to claim 15, wherein, when executed by the one or more processors, the instructions further cause the second electronic device to:
    stop, after determining that the first message is received, displaying the prompt information; and
    replace the prompt information with the first message.

17. The second electronic device of claim 15, wherein, when executed by the one or more processors, the instructions further cause the second electronic device to display the second message after the prompt information.

18. The second electronic device of claim 15, wherein the prompt information comprises at least one of an image, a text, or an animation.

19. The second electronic device of claim 15, wherein, when executed by the one or more processors, the instructions further cause the second electronic device to:
    determine, that the integration message is received before the first message; and
    sequentially display the first message and the second message on a display interface of the second application.

20. The second electronic device of claim 15, wherein the same application is an instant messaging application, a live broadcast application, a video conference application, or an online education application.

* * * * *